(12) United States Patent
Minehara et al.

(10) Patent No.: US 8,918,815 B2
(45) Date of Patent: Dec. 23, 2014

(54) DISPLAY CONTROL DEVICE, TELEVISION RECEIVER, METHOD OF CONTROLLING DISPLAY, DISPLAY CONTROL PROGRAM AND RECORDING MEDIUM

(75) Inventors: Aya Minehara, Osaka (JP); Ai Terashima, Osaka (JP); Yoshinori Oonishi, Osaka (JP); Kinya Fujimoto, Osaka (JP); Kazunori Yoshizawa, Osaka (JP); Yoshinori Ohmura, Osaka (JP); Yukimi Kawaguchi, Osaka (JP); Yuhji Ohi, Osaka (JP); Keiichiro Sato, Osaka (JP); Yumiko Saimen, Osaka (JP); Akihiko Ito, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/976,267

(22) PCT Filed: Dec. 28, 2011

(86) PCT No.: PCT/JP2011/080442

§ 371 (c)(1),
(2), (4) Date: Aug. 12, 2013

(87) PCT Pub. No.: WO2012/091106

PCT Pub. Date: Jul. 5, 2012

(65) Prior Publication Data

US 2013/0318554 A1 Nov. 28, 2013

(30) Foreign Application Priority Data

Dec. 28, 2010 (JP) .................................. 2010-294117
Dec. 26, 2011 (JP) .................................. 2011-284544

(51) Int. Cl.
*G06F 3/00* (2006.01)
*G06F 13/00* (2006.01)
*H04N 5/445* (2011.01)
*H04N 21/482* (2011.01)
*H04N 21/431* (2011.01)

(52) U.S. Cl.
CPC ....... *H04N 21/4821* (2013.01); *H04N 5/44543* (2013.01); *H04N 21/4314* (2013.01); *H04N 2005/44556* (2013.01)
USPC .................... 725/52; 725/39; 725/44; 725/48

(58) Field of Classification Search
USPC ...................................................... 725/37–61
See application file for complete search history.

(56) References Cited

U.S. PATENT DOCUMENTS 6,392,709 B1 * 5/2002 Orito .............................. 348/569
7,681,141 B2 * 3/2010 Tu ................................. 715/784
(Continued)

FOREIGN PATENT DOCUMENTS

JP 2005-143123 A 6/2005
JP 2006-157395 A 6/2006
(Continued)

*Primary Examiner* — Mushfikh Alam
(74) *Attorney, Agent, or Firm* — Birch, Stewart, Kolasch & Birch, LLP

(57) ABSTRACT

The television (1) includes: an infrared radiation receiver (119) which receives from a user an instruction to select a program cell; and a CPU (118) which generates a user interface screen of an electronic program table to be displayed on an LCD (110). The CPU (118) generates the user interface screen of the electronic program table such that a time zone item column located in a left direction of a selected program cell and a time zone item column located in a right direction of the selected program cell are indicated with deep blue, and other time zone item columns are indicated with light blue.

13 Claims, 23 Drawing Sheets

(56) References Cited

U.S. PATENT DOCUMENTS

| | | | |
|---|---|---|---|
| 2004/0088727 A1* | 5/2004 | Kamiya | 725/52 |
| 2005/0154988 A1* | 7/2005 | Proehl et al. | 715/720 |
| 2005/0278738 A1* | 12/2005 | Kaneko et al. | 725/40 |
| 2007/0028267 A1* | 2/2007 | Ostojic et al. | 725/52 |
| 2007/0083892 A1* | 4/2007 | Yun et al. | 725/39 |
| 2009/0064222 A1* | 3/2009 | Dawson et al. | 725/38 |
| 2009/0113478 A1* | 4/2009 | Haughawout et al. | 725/40 |
| 2009/0199238 A1* | 8/2009 | Kummer | 725/39 |
| 2010/0180303 A1* | 7/2010 | Kudo | 725/44 |
| 2012/0246682 A1* | 9/2012 | de Andrade et al. | 725/45 |
| 2012/0324512 A1* | 12/2012 | Cahnbley et al. | 725/53 |
| 2013/0111397 A1* | 5/2013 | Miyoshi et al. | 715/784 |
| 2013/0152129 A1* | 6/2013 | Alberth et al. | 725/41 |
| 2013/0152130 A1* | 6/2013 | Stallings et al. | 725/41 |
| 2013/0318554 A1* | 11/2013 | Minehara et al. | 725/39 |
| 2014/0143812 A1* | 5/2014 | Smith et al. | 725/56 |

FOREIGN PATENT DOCUMENTS

| | | |
|---|---|---|
| JP | 2006-203535 A | 8/2006 |
| JP | 2006-210966 A | 8/2006 |
| JP | 2006-287563 A | 10/2006 |
| JP | 2007-074603 A | 3/2007 |
| JP | 2008-306249 A | 12/2008 |
| JP | 2009-010892 A | 1/2009 |
| JP | 2009-284437 A | 12/2009 |
| JP | 2010-010888 A | 1/2010 |

* cited by examiner

FIG. 3
WHILE CURSOR IS BEING MOVED
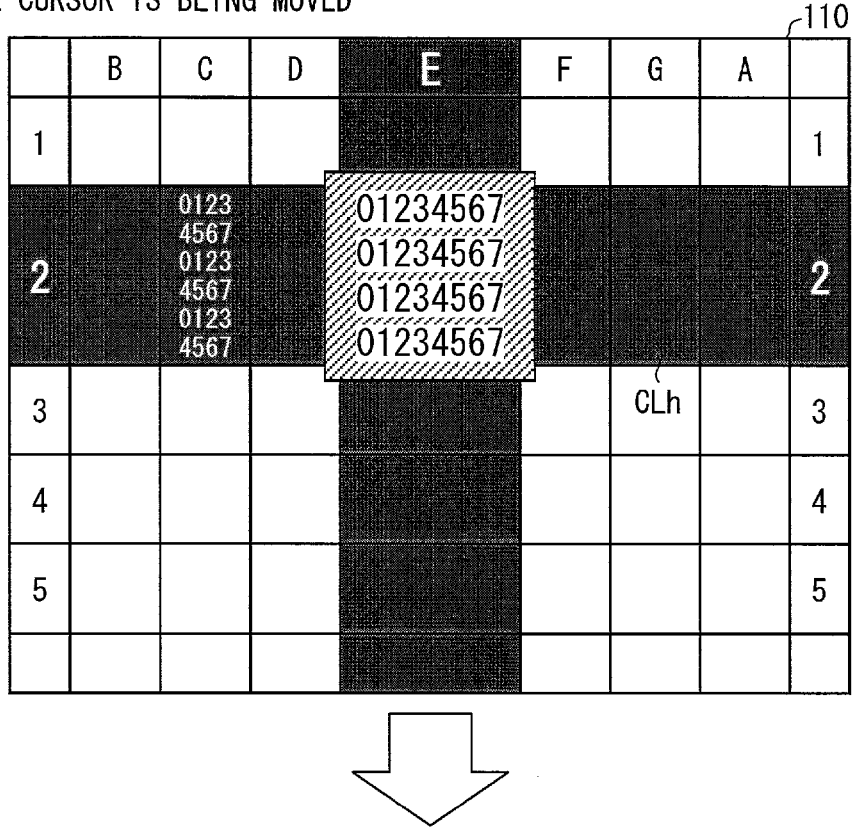
AFTER CURSOR IS MOVED
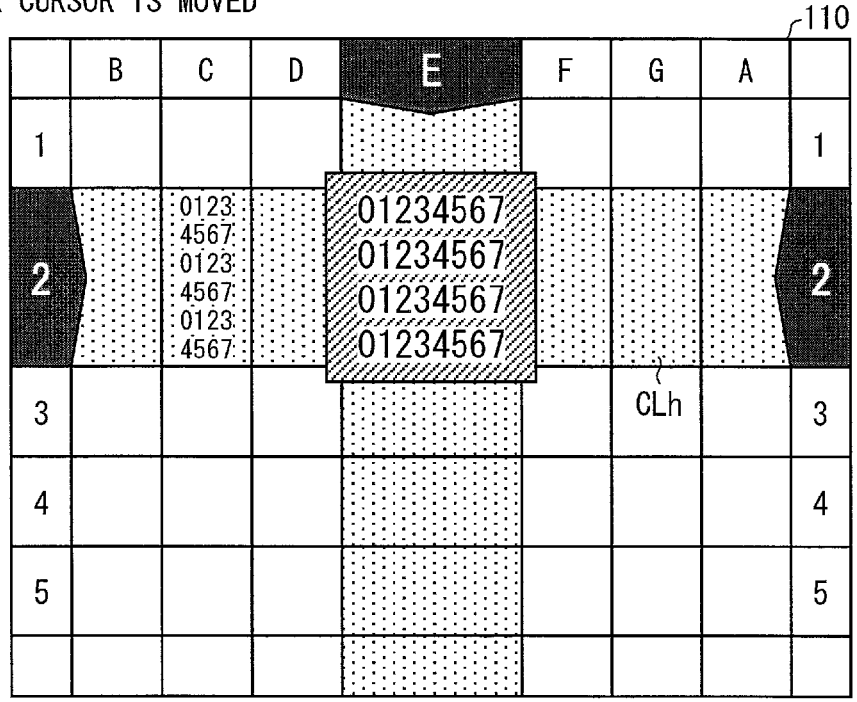

(a) AFTER CURSOR IS MOVED (b) CERTAIN TIME PERIOD HAS PASSED AFTER CURSOR WAS MOVED

F I G. 1 2
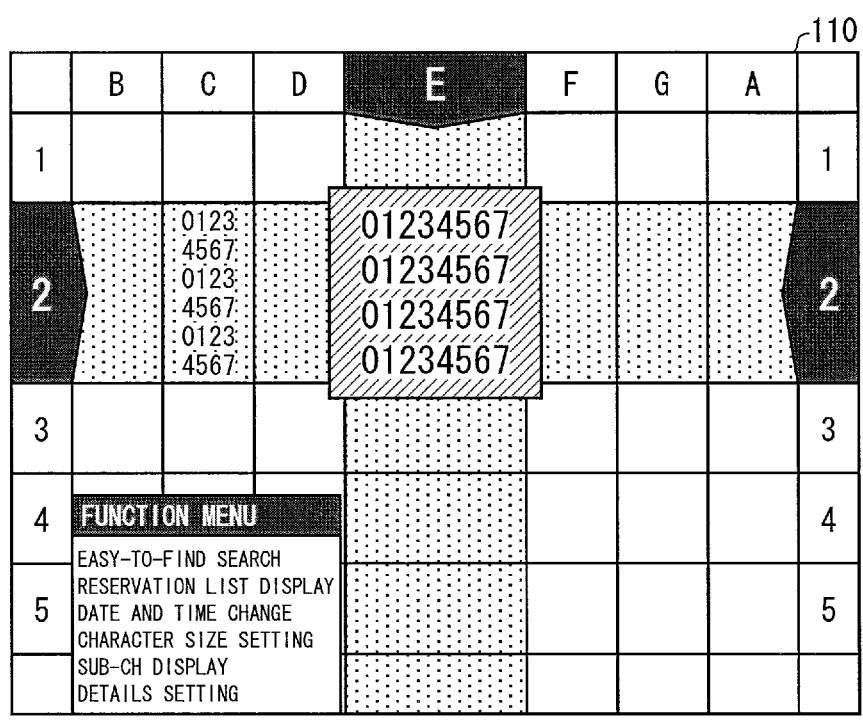

F I G. 1 5

|   | A | B | C | D | E | F | G | H |   |
|---|---|---|---|---|---|---|---|---|---|
|   |   |   |   |   |   |   |   |   |   |
| 1 |   |   |   |   |   |   |   |   | 1 |
| 2 |   |   | 0123 4567 |   | 0123 4567 |   |   |   | 2 |
| 3 |   |   |   |   |   |   |   |   | 3 |
| 4 |   |   |   |   |   |   |   |   | 4 |
| 5 |   |   |   |   |   |   |   |   | 5 |
|   |   |   |   |   |   |   |   |   |   |

| BROADCAST TIME PERIOD | PROGRAM TITLE |
|---|---|
| 0:00 − 0:45 (45 mins) | AAA |
| 0:45 − 0:50 ( 5 mins) | BBB |
| 0:50 − 0:55 ( 5 mins) | CCC |
| 0:55 − 1:00 ( 5 mins) | DDD |

(b)

| | |
|---|---|
| 00: | AAA |
| 45: | BBB |
| 50: | CCC |
| 55: | DDD |

(c)

```
00: AAA
  ...L2
  ...L3
  ...L4
  ...L5
45: BBB
50: CCC
55: DDD
```

| BROADCAST TIME PERIOD | PROGRAM TITLE |
|---|---|
| 0:00 − 0:05 ( 5 mins) | AAA |
| 0:05 − 0:10 ( 5 mins) | BBB |
| 0:10 − 0:15 ( 5 mins) | CCC |
| 0:15 − 0:20 ( 5 mins) | DDD |
| 0:20 − 0:25 ( 5 mins) | EEE |
| 0:25 − 0:30 ( 5 mins) | FFF |
| 0:30 − 0:35 ( 5 mins) | GGG |
| 0:35 − 0:40 ( 5 mins) | HHH |
| 0:40 − 0:45 ( 5 mins) | III |
| 0:45 − 0:50 ( 5 mins) | JJJ |
| 0:50 − 0:55 ( 5 mins) | KKK |
| 0:55 − 0:60 ( 5 mins) | LLL |

(b)

| | |
|---|---|
| 00: | AAA |
| 05: | BBB |
| 10: | CCC |
| 15: | DDD |

←ANCHOR DISPLAY (c)

| | |
|---|---|
| 00: | AAA |
| 05: | BBB |
| 10: | CCC |
| 15: | DDD |
| 20: | EEE |
| 25: | FFF |
| 30: | GGG |
| 35: | HHH |

←ANCHOR DISPLAY

| BROADCAST TIME PERIOD | PROGRAM TITLE |
|---|---|
| 0:00 − 0:45 (45 mins) | AAA |
| 0:45 − 0:50 ( 5 mins) | BBB |
| 0:50 − 0:55 ( 5 mins) | CCC |
| 0:55 − 1:05 (10 mins) | DDD |
| 1:05 − 2:00 (55 mins) | EEE |

(b)

```
00: AAA
45: BBB
50: CCC
55: DDD
...L2
05: EEE
...L2
...L3
```

F I G. 1 9

(a)

| BROADCAST TIME PERIOD | PROGRAM TITLE |
|---|---|
| 0:00 − 0:45 (45 mins) | AAA |
| 0:45 − 0:50 ( 5 mins) | BBB |
| 0:50 − 0:56 ( 6 mins) | CCC |
| 0:56 − 1:10 (14 mins) | DDD |
| 1:04 − 2:00 (50 mins) | EEE |

(b)

```
00: AAA
45: BBB
50: CCC
56: DDD
...L2
10: EEE
...L2
...L3
```

F I G. 2 0

(a)

| BROADCAST TIME PERIOD | PROGRAM TITLE |
|---|---|
| 0:00 – 0:45 (45 mins) | AAA |
| 0:45 – 0:50 ( 5 mins) | BBB |
| 0:50 – 0:56 ( 6 mins) | CCC |
| 0:56 – 1:04 ( 8 mins) | DDD |
| 1:04 – 2:00 (56 mins) | EEE |

(b)

```
00: AAA
45: BBB
50: CCC
56: DDD
04: EEE
...L2
...L3
...L4
```

F I G. 2 1
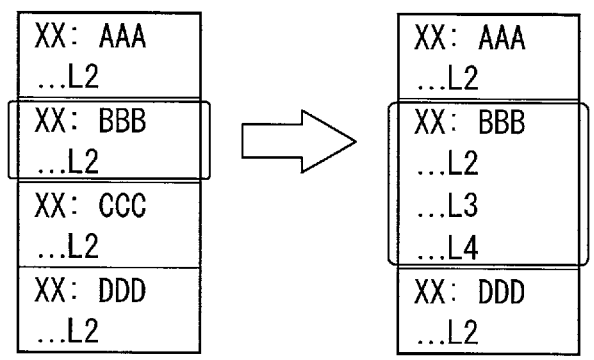

F I G. 2 3

```
                                                                              ┌1000
┌─────────────────────────────────────────────────────────────────────────────────┐
│ EASY-TO-FIND SEARCH                                                             │
│                                                                                 │
│              ┌──────────────────────────────────────────────────────────────┐   │
│              │ TODAY │ 18[Sat.] 19[Sun.] 20[Mon.] 21[Tues.] 22[Wed.] 23[Thurs.] 24[Fri.] │
│ ┌──────────┐ ├──────────────────────────────────────────────────────────────┤   │
│ │SEARCH CRITERIA│ CH TV STATION              PROGRAM TITLE        BROADCAST DATE AND TIME │
│ │          │   1 GOVERNMENT BROADCASTING STATION NEWS-WEATHER NEWS  12/17 (Fri.) 11:00~11:05 │
│ │■GENRE    │   7 TOKYO TV STATION          MORNING NEWS        12/17 (Fri.) 11:00~11:25 │
│ │ NEWS/REPORT│ 1 GOVERNMENT BROADCASTING STATION HELLO METROPOLITAN AREA 12/17 (Fri.) 11:05~11:30 │
│ │■KEY WORD │   5 ASAHI TV STATION          GOSSIP SHOW         12/17 (Fri.) 11:25~13:05 │
│ │ "TOP OF A HILL"│ 1 GOVERNMENT BROADCASTING STATION NEWS        12/17 (Fri.) 11:30~11:35 │
│ │■ATTRIBUTE│   4 JAPAN TV STATION          JAPAN TV STATION NEWS 12/17 (Fri.) 11:30~11:45 │
│ │ TELETEXT BROADCAST│ 8 FUJI TV STATION     LUNCHTIME NEWS      12/17 (Fri.) 11:30~12:00 │
│ │ REBROADCAST│ 1 GOVERNMENT BROADCASTING STATION HELLO METROPOLITAN AREA 12/17 (Fri.) 11:35~11:54 │
│ │          │   1 GOVERNMENT BROADCASTING STATION WEATHER NEWS     12/17 (Fri.) 11:54~12:00 │
│ │          │   1 GOVERNMENT BROADCASTING STATION NEWS             12/17 (Fri.) 12:00~12:20 │
│ │          │   1 GOVERNMENT BROADCASTING STATION NEWS             12/17 (Fri.) 13:00~13:05 │
│ │          │   2 EDUCATION TV STATION      SIGN-LANGUAGE NEWS   12/17 (Fri.) 13:00~13:30 │
│ └──────────┘ └──────────────────────────────────────────────────────────────┘   │
│      1010                              1020                                     │
└─────────────────────────────────────────────────────────────────────────────────┘
```

DISPLAY CONTROL DEVICE, TELEVISION RECEIVER, METHOD OF CONTROLLING DISPLAY, DISPLAY CONTROL PROGRAM AND RECORDING MEDIUM

TECHNICAL FIELD

The present invention relates to a display control device, in particular a television receiver, which controls display of an electronic program table. The present invention also relates to a method of controlling the display of the display control device. The present invention further relates to a display control program that causes a computer to function as the display control device, and to a recording medium in which the display control program is stored.

BACKGROUND ART

In digital broadcasting, every broadcasting station has three channels, so that more channels are used in the digital broadcasting than in analog broadcasting. In addition, expansion of satellite digital broadcasting (such as BS digital and CS digital broadcasting) and IP broadcasting, and CATV broadcasting in foreign countries contribute to broadcasting of programs at a large number of channels.

Almost all televisions on the market today have a function to display an electronic program table these days. In view of the above circumstances, there have been increased the number of channels whose program information is displayed in an electronic program table and an amount of detailed information to be displayed in a selected program. This increases the number of cells and a display size of the electronic program table to be displayed on a screen.

For example, in a case of a television having a function of displaying an electronic program table, in order to search a program which is not displayed on the screen at that time by changing a date or a time so as to display a date or a time of the program, it is generally possible to adjust a range of the electronic program table to be displayed on the screen at a time by decreasing or increasing a size of the electronic program table. In particular, a large-screen television, which has been spread recently, can display most of a whole electronic screen table at a time by displaying a reduced image of the electronic program table.

However, in a case where the reduced image of the electronic program table is displayed in the large-screen television, a large number of program cells are displayed on the screen at a time. It is therefore difficult for a user to determine at a glance a program cell that the user selects. In a case where the program cell that the user selected is located around a center of a display screen, it is not easy to understand at a glance a correspondence between a broadcasting channel name of a program of the program cell and a time zone of the program.

An invention made in view of the circumstances is described in Patent Literature 1. Patent Literature 1 discloses a program table displaying device in which a program cell selected by a user is grayed out in an electronic program table. Specifically, in a case where the program table displaying device receives a predetermined operation instruction while a certain program cell is being selected, the program table displaying device grays out the program cell. Therefore, the program table displaying device allows a user to determine at a glance which program cell the user selects.

Patent Literature 2 discloses a technique for displaying a program cell selected by a predetermined criterion in a display state different from those of other program cells.

Patent Literature 3 discloses an electronic program table making device that generates a program table in which time zone information and channel information are displayed in a top end and a left end, respectively. The electronic program table making device changes vertical and horizontal widths of program cells located in a cross shape around a selected program cell in the program table so that the vertical and horizontal widths are twice as long as those of other program cells. Therefore, the electronic program table making device of Patent Literature 3 allows a user to easily grasp when and at which channel a program of the selected program cell is broadcasted.

CITATION LIST

Patent Literature

Patent Literature 1
Japanese Patent Application Publication, Tokukai, No. 2009-284437 A (Publication Date: Dec. 3, 2009)
Patent Literature 2
Japanese Patent Application Publication, Tokukai, No. 2005-143123 A (Publication Date: Jun. 2, 2005)
Patent Literature 3
Japanese Patent Application Publication, Tokukai, No. 2006-203535 A (Publication Date: Aug. 3, 2006)

SUMMARY OF INVENTION

Technical Problem

In a configuration of the Patent Literature 3, however, in some cases, it is impossible to grasp at a glance when and at which channel the program of the selected program cell is broadcasted.

For example, in a case where the electronic program table is fully displayed in a large-screen television, problems such as (1) and (2) below are caused.

(1) It is hard for a user who watches a television from a place near a limit of a viewing angle on a right side of the television to read time zone information placed in a left end of the electronic program table. Therefore, it is hard for the user to grasp when (which time zone) the program of the selected program cell is broadcasted unless the user moves.

(2) It is hard to see a correspondence between a program cell located in a right end of the electronic program table and time zone information located in a left end of the electronic program table. Therefore, in a case where the selected program cell is in the right end of the electronic program table, it is hard to grasp at a glance when (which time zone) the program of the selected program cell is broadcasted.

The present invention has been made in view of the above problems, and a main object of the present invention is to provide a display control device that allows a user to easily grasp a broadcast time or a broadcast station of a selected program cell.

Solution to Problem

In order to achieve the above object, a display control device in accordance with the present invention includes: display controlling means for generating a user interface screen of an electronic program table including one first horizontal strip region or a pair of first horizontal strip regions and one first vertical strip region or a pair of first vertical strip regions, and displaying the user interface screen on a display section, one of (i) the first horizontal strip region(s) and (ii)

the first vertical strip region(s) being a region for displaying a broadcast time zone, the other one of (i) the first horizontal strip region(s) and (ii) the first vertical strip region(s) being a region for displaying at least one of a channel name and a broadcasting station name; and an instruction reception section which receives from a user an instruction to select a program cell from a plurality of program cells arranged like tiles in the electronic program table displayed on the display section, in a case where the user interface screen is displayed on the display section, the display controlling means providing, as first strip regions, the first horizontal strip region(s) and the first vertical strip region(s) in a peripheral portion of the electronic program table such that at least either of the pair of the first horizontal strip regions or the pair of the first vertical strip regions is provided, the display controlling means displaying specific regions and other regions in different display states in a case where the instruction reception section receives the instruction, which specific regions are located in the first strip regions in pair, respectively, located in the peripheral portion, and are located in a horizontal direction or a vertical direction of the program cell which has been selected in response to the instruction that the instruction reception section received, which other regions are regions located in the first strip regions in pair but other than the specific regions.

According to the above configuration, in a case where the pair of regions for displaying the broadcast time zone as the first-strip region is provided in the peripheral portion of the electronic program table, the display control device displays the specific region for displaying the broadcast time zone, in which the program of the selected program cell is broadcasted, so that the broadcast time zone attracts a user's attention. Similarly, in a case where the pair of regions for displaying, as the first-strip region, at least one of the channel name and the broadcasting station name in the peripheral portion of the electronic program table, the display control device displays the specific regions for displaying the name of the channel (or the name of broadcasting station), which broadcasts the program of the selected program cell, so that the name of the channel (or the name of broadcasting station) attracts a user's attention. The specific regions are located on at least one of (i) both right and left sides and (ii) both top and bottom sides in the electronic program table.

Accordingly, the display control device allows a user to easily grasp a broadcast time or a broadcast station of a selected program cell.

In order to achieve the above object, the display control device in accordance with the present invention includes the steps of: a display control step of generating a user interface screen of an electronic program table including one first horizontal strip region or a pair of first horizontal strip regions and one first vertical strip region or a pair of first vertical strip regions, and displaying the user interface screen on a display section, one of (i) the first horizontal strip region(s) and (ii) the first vertical strip region(s) being a region for displaying a broadcast time zone, the other one of (i) the first horizontal strip region(s) and (ii) the first vertical strip region(s) being a region for displaying at least one of a channel name and a broadcasting station name; and an instruction reception step of receiving from a user an instruction to select a program cell from a plurality of program cells arranged like tiles in the electronic program table displayed on the display section, in a case where the user interface screen is displayed on the display section, the display controlling step including a step of providing, as first strip regions, the first horizontal strip region(s) and the first vertical strip region(s) in a peripheral portion of the electronic program table such that at least either of the pair of the first horizontal strip regions or the pair of the first vertical strip regions is provided, the display controlling step including a step of displaying specific regions and other regions in different states in a case where the instruction is received in the instruction reception step, which specific regions are located in the first strip regions in pair, respectively, located in the peripheral portion, and are located in a horizontal direction or a vertical direction of the program cell which has been selected in response to the instruction that the instruction reception section received, which other regions are regions located in the first strip regions in pair but other than the specific regions.

According to the above configuration, a display controlling method of the present invention has the same effect as the display control device of the present invention.

Advantageous Effects of Invention

As described above, the display control device of the present invention allows a user to easily grasp a broadcast time or a broadcast station of a selected program cell.

BRIEF DESCRIPTION OF DRAWINGS

FIG. 3 is a schematic view illustrating a specific example of a display state of an electronic program table, which shows a state in which a cursor for selecting a program cell is being moved and a state after the cursor is moved.

Figure 10:
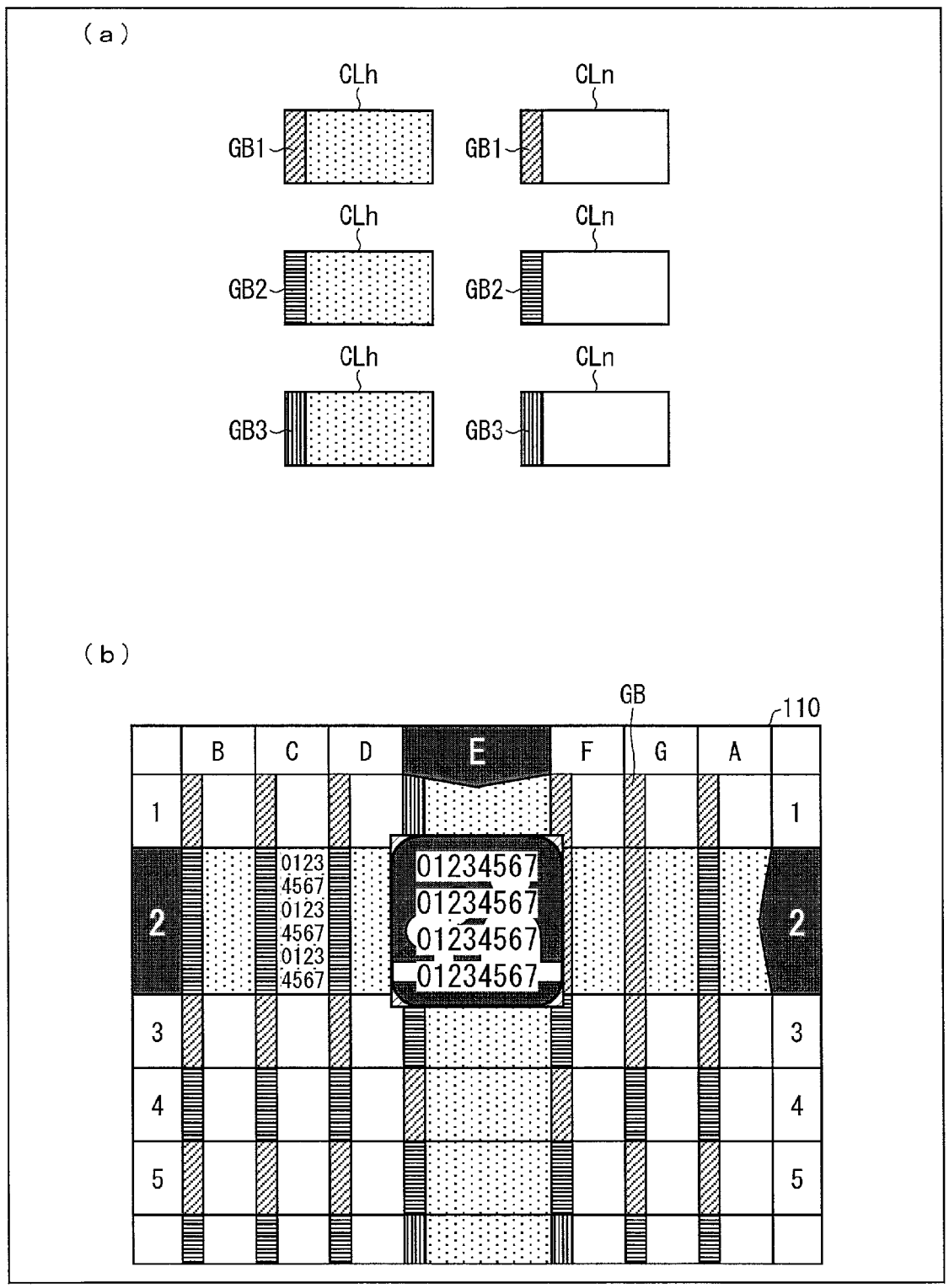
FIG. 10 is schematic views of specific examples of display states of program cells other than a selected cell. (a) of FIG.

10 schematically illustrates the display states of the program cells, and (b) of FIG. 10 schematically illustrates a specific example of a display state of an electronic program table.

Figure 11:
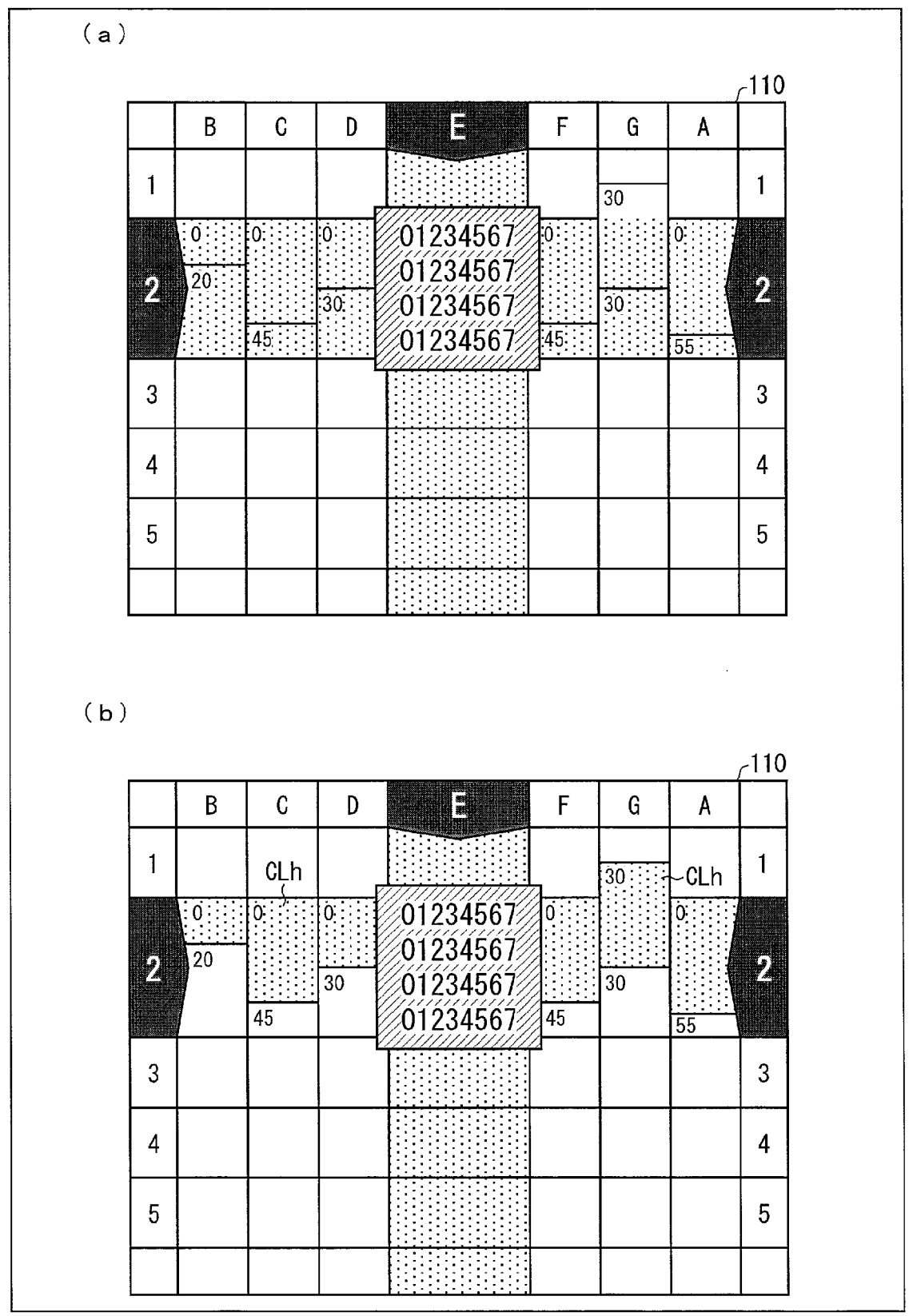

FIG. 11 is a schematic view illustrating a display state of an electronic program table in a case where a start time and a broadcast finish time of a program broadcasted at another channel in a time zone in which a program (hereinafter, referred to also as a target program) whose program information is displayed in a selected cell is broadcasted does not correspond to a start time of and a broadcast finish time of the target program. (a) and (b) of FIG. 11 each illustrate a specific example of the display state.

FIG. 12 is a schematic view illustrating an electronic program table in a state in which a function menu in accordance with a specific example is popped up in response to an operation instruction from a user.

Figure 13:
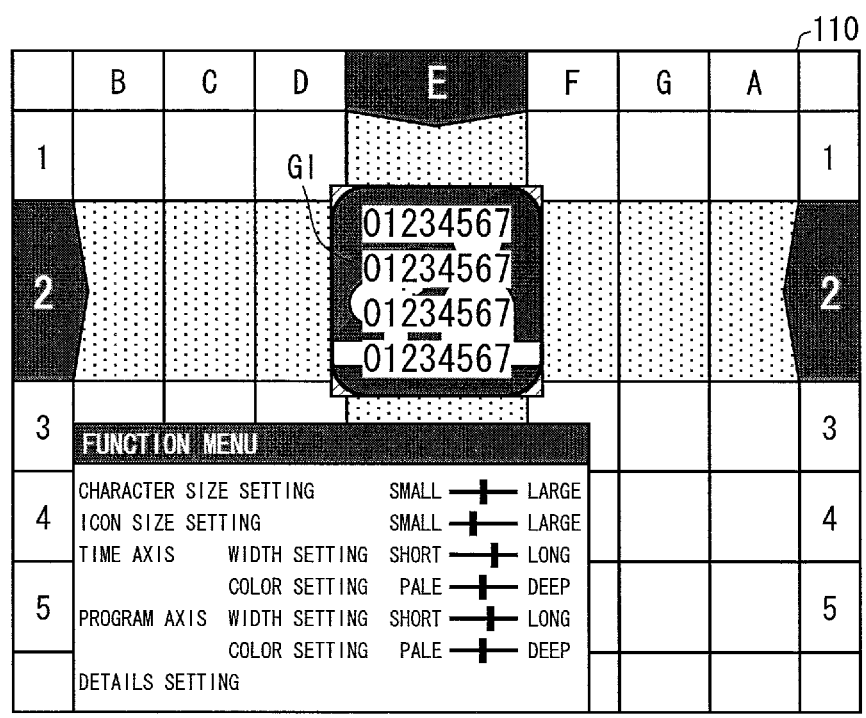

FIG. 13 is a schematic view illustrating an electronic program table in a state in which a function menu in accordance with another specific example is popped up in response to an operation instruction from a user.

Figure 1:
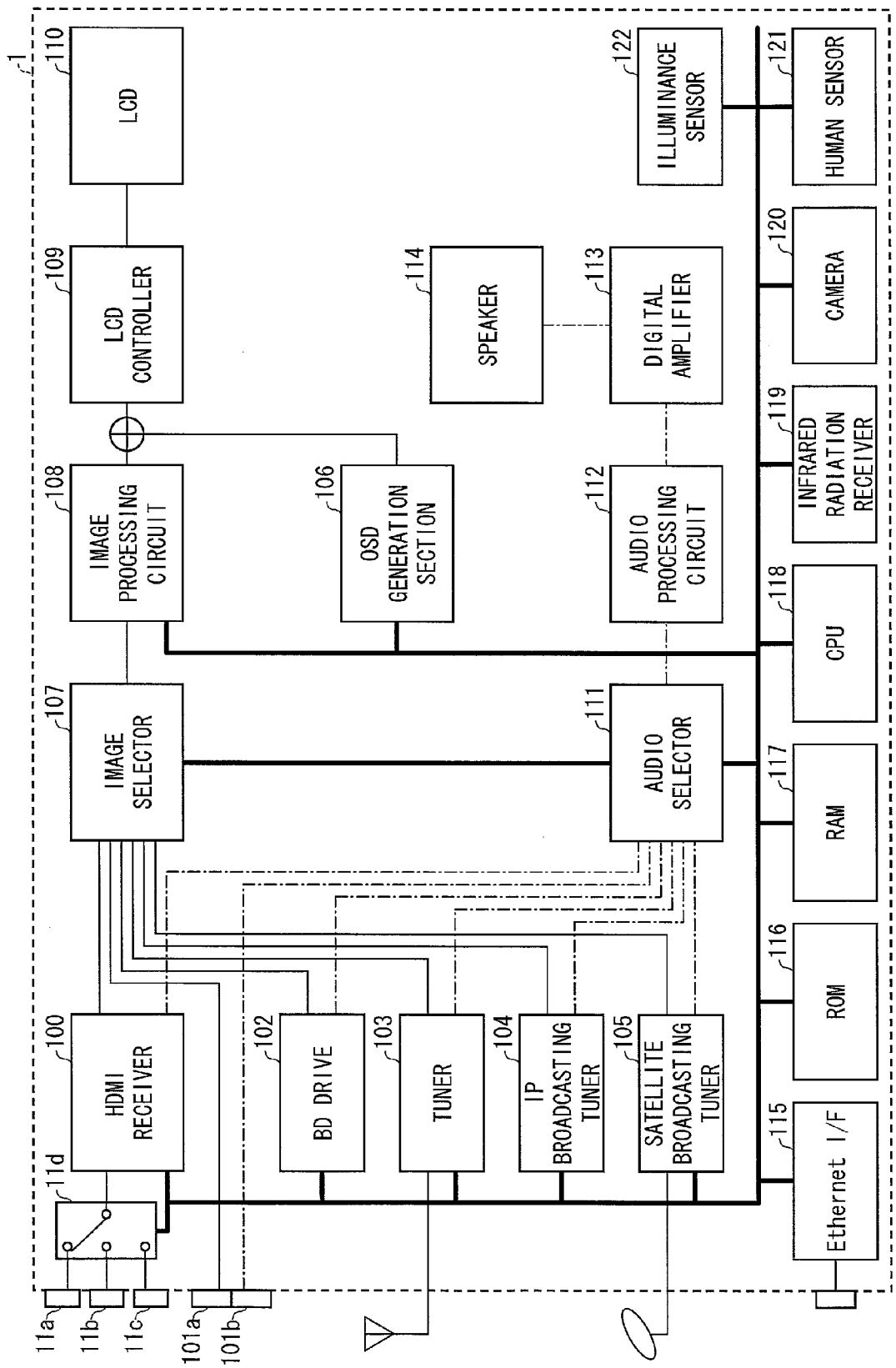
FIG. 1 is a block diagram illustrating a configuration of a liquid crystal television in accordance with an embodiment of the present invention.
Figure 14:
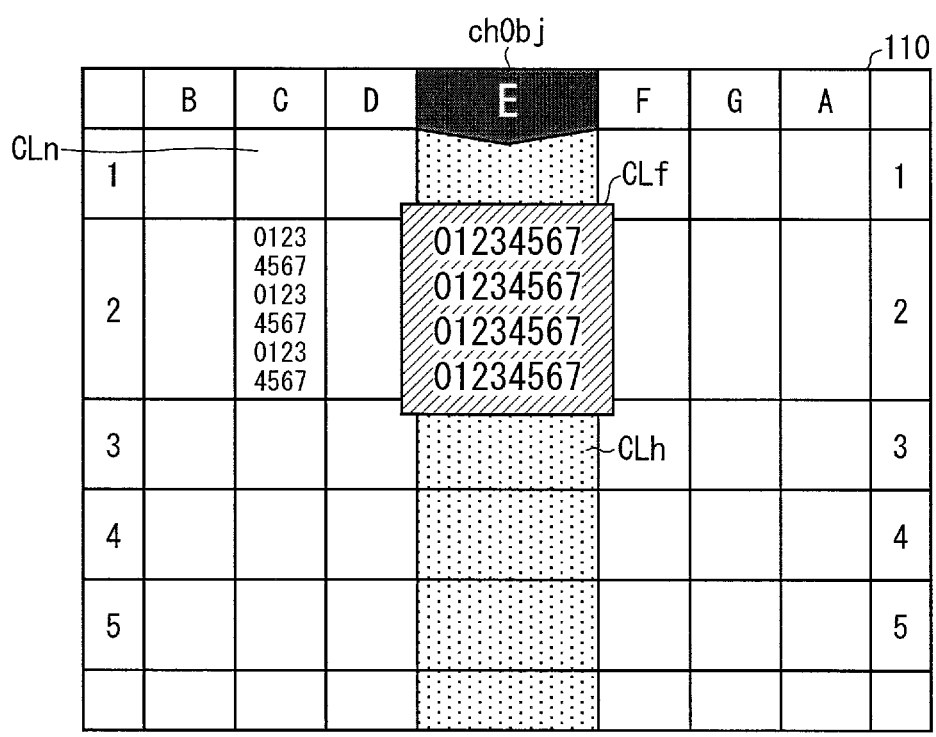

FIG. 14 is a schematic view illustrating another specific example of the display state of the electronic program table that the liquid crystal television of FIG. 1 displays.

FIG. 15 is a schematic view illustrating a conventional electronic program table.

FIG. 16 is views for explaining the number of displayable lines in each program cell of an electronic program table that the liquid crystal television of FIG. 1 displays.

FIG. 17 is other views for explaining the number of displayable lines in each program cell of an electronic program table that the liquid crystal television of FIG. 1 displays.

FIG. 18 is still other views for explaining the number of displayable lines in each program cell of an electronic program table that the liquid crystal television of FIG. 1 displays.

FIG. 19 is yet other views for explaining the number of displayable lines in each program cell of an electronic program table that the liquid crystal television of FIG. 1 displays.

FIG. 20 is yet still other views for explaining the number of displayable lines in each program cell of an electronic program table that the liquid crystal television of FIG. 1 displays.

FIG. 21 is yet still another view for explaining the number of displayable lines in each program cell of an electronic program table that the liquid crystal television of FIG. 1 displays.

Figure 22:
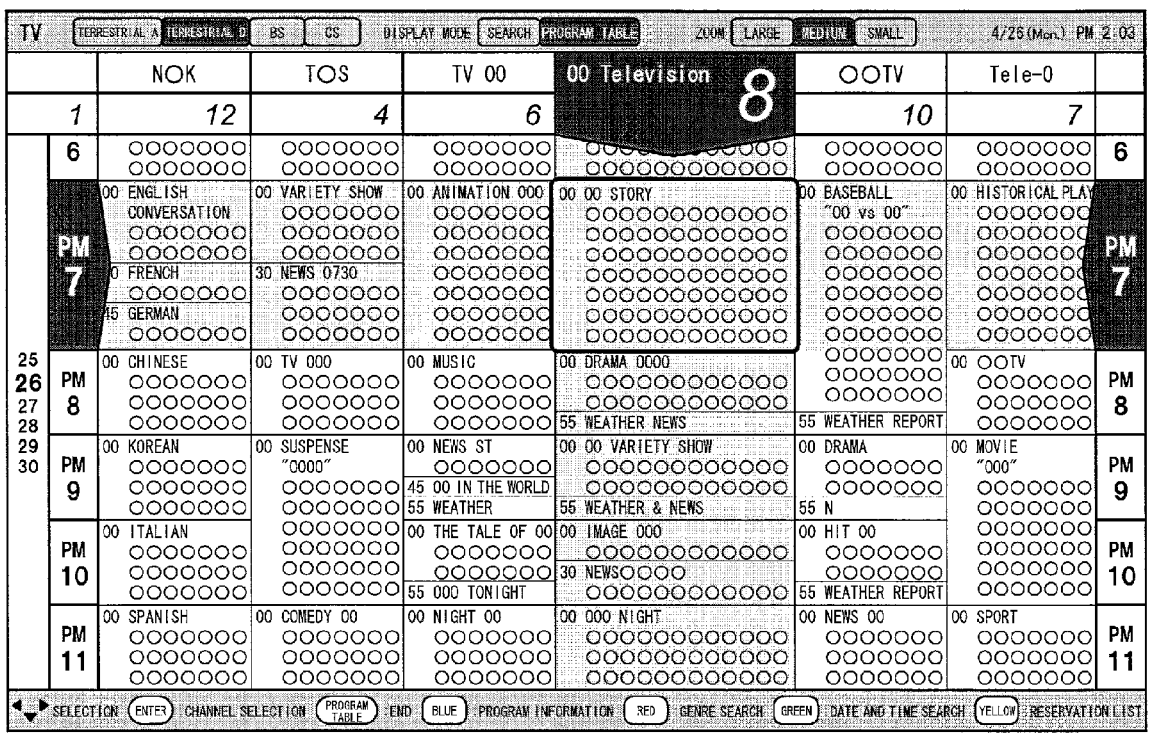

FIG. 22 is a conceptual image of an electronic program table that the liquid crystal display of FIG. 1 displays.

FIG. 23 is a view illustrating a user interface screen which shows a list of programs that are compliant with a search criterion of "easy-to-find search" and other search criteria.

DESCRIPTION OF EMBODIMENTS

The following description will discuss an embodiment of the present invention with reference to drawings. A television receiver (hereinafter, referred to as a liquid crystal television) providing a liquid crystal display as a display device will be exemplified in the following description, however, the present invention is not limited thereto. That is, the liquid crystal television is merely an example of a device which functions as a display device, and, for example, the device can be replaced by other devices such as a plasma television, a video projector, a CRT, and a liquid crystal display monitor.

[Configuration of Liquid Crystal Television]

A configuration of a liquid crystal television 1 will be described below with reference to FIG. 1. FIG. 1 is a view illustrating the configuration of the liquid crystal television 1.

As illustrated in FIG. 1, the liquid crystal television 1 includes: three HDMI input terminals 11a to 11c, an HDMI switch 11d, an HDMI receiver 100, an image input terminal 101a, an audio input terminal 101b, a BD drive 102, a tuner 103, an IP broadcasting tuner 104, a satellite broadcasting tuner 105, an OSD generation section 106, an image selector 107, an image processing circuit 108, an LCD controller 109, an LCD (Liquid Crystal Display) 110, an audio selector 111, an audio processing circuit 112, a digital amplifier 113, a speaker 114, Ethernet (registered trademark) I/F 115, a ROM 116, a RAM 117, a CPU 118, an infrared radiation receiver 119, a camera 120, a human sensor 121, and an illuminance sensor 122. In FIG. 1, a path of an image signal is drawn by a solid line, a path of an audio signal is drawn by an alternate long and short dash line, and a path (bus) of data or a control signal is drawn by a thick line.

The image selector 107 receives the following images: (1) an image received by the HDMI receiver 100; (2) an image supplied via the image input terminal 101a; (3) an image read out from a BD (Blu-ray Disc) by the BD drive 102; (4) an image received by the tuner (for terrestrial digital broadcasting) 103; (5) an image received by the IP broadcasting tuner 104; and (6) an image received by the satellite broadcasting tuner 105. The audio selector 111 receives the following sounds: (1) a sound received by the HDMI receiver 100; (2) a sound supplied via the audio input terminal 101b; (3) a sound read out from the BD by the BD drive 102; (4) a sound received by the tuner 103; (5) a sound received by the IP broadcasting tuner 104; and (6) a sound received by the satellite broadcasting tuner 105.

The tuner 103 and the satellite broadcasting tuner 105 receive program information (EPG information which is text information), which is to be displayed in an electronic program table, of terrestrial broadcasting and satellite broadcasting (e.g., BS broadcasting and CS broadcasting), respectively. The program information is supplied to the RAM 117.

Note that the CPU 118 carries out selection control which determines (a) content supplied via which HDMI input terminal the HDMI receiver 101 receives, i.e., content supplied via which HDMI input terminal the HDMI switch 11d supplies to the HDMI receiver 100, (b) content transmitted via which channel the tuner 103 receives, (c) content delivered from which server the IP broadcasting tuner 104 receives, and (d) content transmitted via which channel the satellite broadcasting tuner 105 receives. The CPU 118 also carries out (e) replay control of the BD drive 102 such as replay, pause, fast-forward, rewind, and chapter transition.

The image selector 107 selects any one of (1) the image supplied from the HDMI receiver 100, (2) the image supplied from the image input terminal 101a, (3) the image supplied from the BD drive 102, (4) the image supplied from the tuner 103, (5) the image supplied from the IP broadcasting tuner 104, and (6) the image supplied from the satellite broadcasting tuner 105. The image, selected by the image selector 107, is supplied to the image processing circuit 108. Note that which image the image selector 107 selects is controlled by the CPU 118.

The image processing circuit 108 adjusts an image quality of the image supplied from the image selector 107. The image processing circuit 108 also carries out scaling with respect to the image supplied from the image selector 107. Such adjustment of the image quality means a change in, for example, at least one of luminance, sharpness, and contrast of the image. The scaling means that a size of the image is reduced while an aspect ratio of the original image to be displayed is being maintained. The image whose image quality has been adjusted and in which scaling has been carried out by the image processing circuit 108 is supplied to the LCD controller 109. Note that how the image processing circuit 108 changes the image quality and how much the image processing circuit 108 reduce the size of the image are controlled by the CPU 118.

In a case where the CPU 118 supplies UI data of the electronic program table to the image processing circuit 108, the image processing circuit 108 converts the UI data to image signals and therefore sends the image signals to the LCD controller 109.

The LCD controller 109 drives the LCD 110 so as to cause the LCD 110 to display the image supplied from the image processing circuit 108. In this way, the image selected by the image selector 107 is displayed on the LCD 110. Note that in a case where an OSD image is supplied from the OSD generation section 106, the LCD controller 109 displays the OSD image so that the OSD image is displayed on the image supplied from the image processing circuit 108.

The audio selector 111 selects any one of the sound supplied from the HDMI receiver 100, a sound supplied from the image input terminal 101a, the sound supplied from the BD drive 102, the sound supplied from the tuner 103, the sound supplied from the IP broadcasting tuner 104, and the sound supplied from the satellite broadcasting tuner 105. The sound, selected by the audio selector 111, is supplied to the audio processing circuit 112. Note that which sound the audio selector 111 selects is controlled by the CPU 118. Note, however, that selection of the image in the image selector 107 and selection of the sound in the audio selector 111 are conjunct with each other, and, for example, in a case where the image selector 107 selects an image supplied from the HDMI receiver 100, the audio selector 111 selects a sound also supplied from the HDMI receiver 100.

The audio processing circuit 112 adjusts a sound volume and a sound quality of the sound supplied from the audio selector 111. Such adjustment of the sound quality means changing a frequency characteristic of the sound supplied from the audio selector 111 (e.g., emphasizing a lower audio frequencies or emphasizing a higher audio frequencies). The sound whose sound volume and sound quality have been adjusted by the audio processing circuit 112 is supplied to the digital amplifier 113. Note that how the audio processing circuit 112 changes the sound volume and the sound quality is controlled by the CPU 118.

The digital amplifier 113 drives the speaker 114 so that the speaker 114 outputs the sound supplied from the audio processing circuit 112. In this way, the sound selected by the audio selector 111 is outputted from the speaker 114.

The CPU 118 controls the above sections in accordance with a remote control signal received by the infrared radiation receiver 119, an image taken by the camera 120, a sensor signal outputted by the human sensor 121, and a sensor signal outputted by the illuminance sensor 122. The sensor signal of the human sensor 121 is a binary signal indicating whether or not a viewer exists within a sensing range of the human sensor 121. The sensor signal of the illuminance sensor 122 is a multilevel signal indicating illuminance (brightness) of a circumference of the illuminance sensor 122. Control with use of the infrared radiation receiver 119 is, for example, display control which causes the electronic program table to be displayed on the LCD 110, control which causes a cursor for selecting a program cell to be moved, and control which causes a function menu regarding the electronic program table to be displayed. Control with use of the camera 120 is, for example, control in which the way to adjust an image quality of a taken image in the image processing circuit 108 is changed in accordance with a viewer who has been specified on the basis of the taken image. Control with use of the human sensor 121 is, for example, control of switching on or off an LED backlight of the LCD 110 in accordance with a sensing result.

The ROM 116 is a readable and unwritable memory in which fixed data such as a program executed by the CPU 118 is stored. JPEG data, to which the OSD generation section 106 refers to generate an OSD image, SVG (Scalable Vector Graphics) data, etc. are also stored in the ROM 116. Various kinds of image data (e.g., image data of a genre icon displayed in the program cell of the electronic program table) constituting a UI of the electronic program table are stored in the ROM 116. Meanwhile, the RAM 117 is a readable and writable memory in which variable data, such as data to which the CPU 118 refers to perform calculation and data that the CPU 118 generates by performing calculation, is stored. For example, program information to be displayed in the electronic program table is stored in the RAM 117.

The Ethernet I/F 115 is an interface for connecting the television 1 to a network. The IP broadcasting tuner 105 accesses a server on the Internet via the Ethernet I/F 115.

(Operation of Liquid Crystal Television 1)

The following description will schematically discuss, with reference to drawings, an operation in which the liquid crystal television 1 displays the electronic program table when a user pushes a program table button of a remote controller (not shown). Note that specific methods for realizing the operation schematically described below can be understood by a person skilled in the art as appropriate on the basis of the common general technical knowledge as the present application was originally filed. Therefore, detailed description of the operation will be herein omitted.

The infrared radiation receiver 119 receives an operation signal of the program table button.

Figure 2:
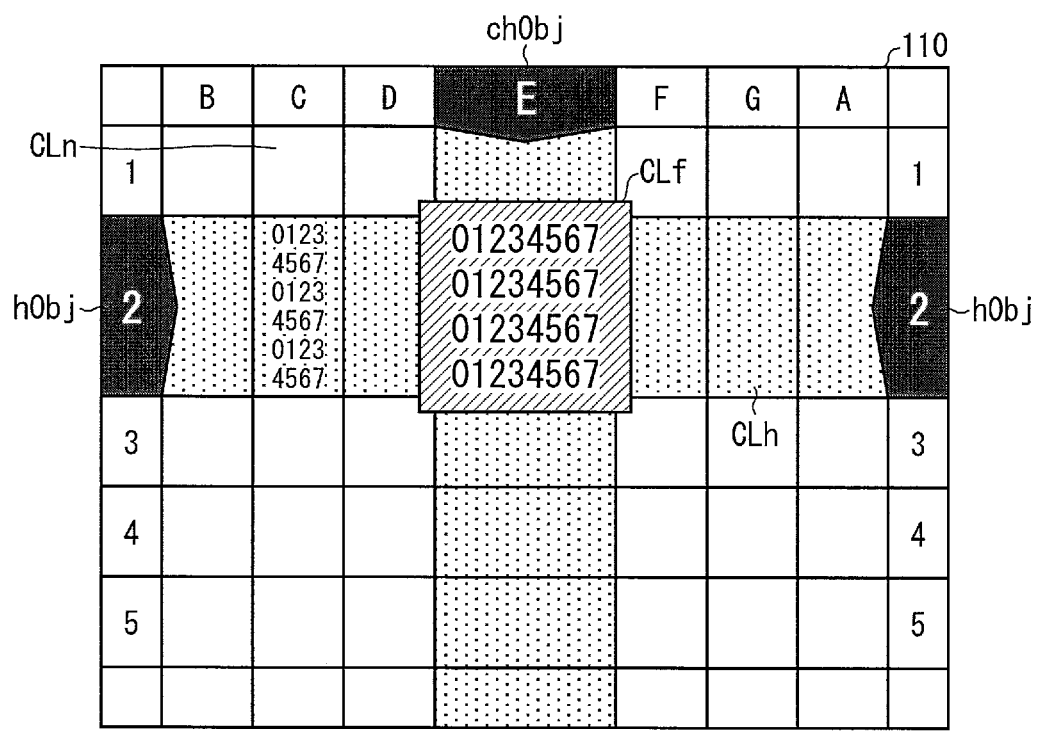
FIG. 2 is a schematic view illustrating a specific example of a display state of an electronic program table that the liquid crystal television of FIG. 1 displays.

In a case where the CPU 118 senses that the infrared radiation receiver 119 has received the operation signal of the program table button, the CPU 118 generates the electronic program table by combining the image data stored in the ROM 116 and the program information stored in the RAM 117 with each other. The CPU 118 supplies the UI data of the electronic program table thus generated to the image processing circuit 108. In this way, the LCD 110 displays the electronic program table as illustrated in FIG. 2. Note that a program cell to be a selected cell by default in FIG. 2 may be determined, for example, on the basis of a current time, a channel that the television 1 displayed last time, or the like.

(UI of Electronic Program Table)

FIG. 2 is a schematic view of the electronic program table whose UI data is made by the CPU 118 and which is to be displayed on the LCD 110. Each item column (first horizontal strip region) which is horizontally located along with a peripheral portion (specifically, a top end portion) of the electronic program table in FIG. 2 indicates a channel. That is, A to G indicate A to G channels. Meanwhile, each item column (pair of first vertical-strip regions) which is vertically located along with a peripheral portion (specifically, a left end portion and a right end portion) of the electronic program table indicates a time zone. That is, items "1" to "5" indicate "between 1 o'clock and 2 o'clock" to "between 5 o'clock and 6 o'clock", respectively. A program cell CLf of a program broadcasted from 2 o'clock to 3 o'clock at an E channel, which is a shaded area in FIG. 2, indicates the selected cell.

Numbers, such as "01234567", displayed in the program cell schematically represent letters or symbols indicating program information to be displayed.

Program cells CLh, which are a dotted area in FIG. 2, indicate program cells of programs to be broadcasted at the same channel or in the same time zone as that of the selected cell CLf. Cells other than CLf and CLh in the electronic program table (i.e., the other program cells) displayed are represented by CLn.

Slashes of the program cell (selected cell CLf) in FIG. 2 indicates a background color of yellow, and the dots of the program cells CLh in FIG. 2 indicates a background color of light blue. A background color of the other program cells CLn is white.

In FIG. 2, channel items and time-zone items have background colors of a bluish color, and background colors of a channel item and time-zone items filled with black in FIG. 2 are deeper blue in comparison with the other time-zone items.

A color arrangement of the electronic program table is as described above in this embodiment, however, the present invention is not limited to the above provided that a viewer can easily recognize a color difference between(among) those items.

Note that the description regarding FIG. 2 can be applied to description of electronic program tables of FIG. 3 and above.

As illustrated in FIG. 2, the CPU 118 changes, to light blue, a background color of the program cells CLh located in vertical and horizontal directions of the selected cell. That is, the CPU 118 changes, to light blue, (i) a background color of program cells to be broadcasted at other channels in the same time zone as that of a target program and (ii) a background color of program cells to be broadcasted in other time zones at a target channel at which the target program is to be broadcasted.

As illustrated in FIG. 2, the CPU 118 changes (i) widths of the program cells CLh located in the vertical direction of the selected cell so that the widths are relatively wider than widths of program cells to be broadcasted at channels other than the target channel and (ii) lengths of the program cells CLh located in the horizontal direction of the selected cell so that the lengths are relatively longer than lengths of program cells broadcasted in time zones other than the time zone in which the target program is to be broadcasted. Strictly speaking, the lengths of the program cells are determined on the basis of a length of a time period in which a program is broadcasted. In this embodiment, however, a length of a program cell CLh in a case where a certain program is a program of the program cell CLh located in the horizontal direction of the selected cell CLf is longer than a length of a program cell CLn in a case where the certain program is a program of the program cell CLn.

As illustrated in FIG. 2, the CPU 118 changes (i) a width of the selected cell so that the width is relatively wider than the widths of the program cells CLh in other time zones at the target channel and (ii) a length of the selected cell so that the length is relatively longer than the lengths of the program cells CLh of other programs broadcasted in the same time zone as that of the target program. Strictly speaking, a length of a selected cell CLf of a certain program in a case where the certain program is the target program is longer than a length of a program cell CLh of a certain program in a case where the certain program is a program of the program cell CLh located in the horizontal direction of the selected cell CLf.

As illustrated in FIG. 2, the CPU 118 changes, to deep blue, background colors of time-zone item columns hObj (specific regions in the first-strip region) in which the target program is broadcasted, and differentiates shapes of the time-zone item columns hObj from those of other time-zone item columns (regions which are in the first-strip region but other than the specific region). Specifically, as illustrated in FIG. 2, the CPU 118 causes the other time-zone item columns to be displayed in the form of rectangle, whereas the CPU 118 causes the columns hObj to be displayed in the form of home base such that four apexes are located on apexes of adjacent item columns and another apex is located in a region where a program cell is displayed. The CPU 118 changes, to deep blue, a background color of a channel item column chObj at which the target program is to be broadcasted, and differentiates a shape of the channel item column chObj from shapes of other channel item columns.

Note that a character size (or a thickness) of a letter indicating a broadcast time zone in the columns hObj may be relatively larger (thicker) than letters indicating broadcast time zones in other item columns Similarly, a character size (or a thickness) of a letter indicating a channel in the item column chObj may be relatively larger (thicker) than letters indicating channels in other channel item columns. The CPU 118 may also control the background color of the program cells located in the vertical direction and the horizontal direction of the selected cell so that the background color of the program cells CLh while a move instruction of a cursor is being received differs from the background color after the CPU 118 detects that the move instruction of the cursor is stopped.

For example, as illustrated in FIG. 3, the CPU 118 may change the background color of the program cell Ch to deep blue while the move instruction of the cursor is being received, and may change the background color of the program cell Ch to light blue after the CPU 118 detects that the move instruction of the cursor is stopped.

Figure 4:
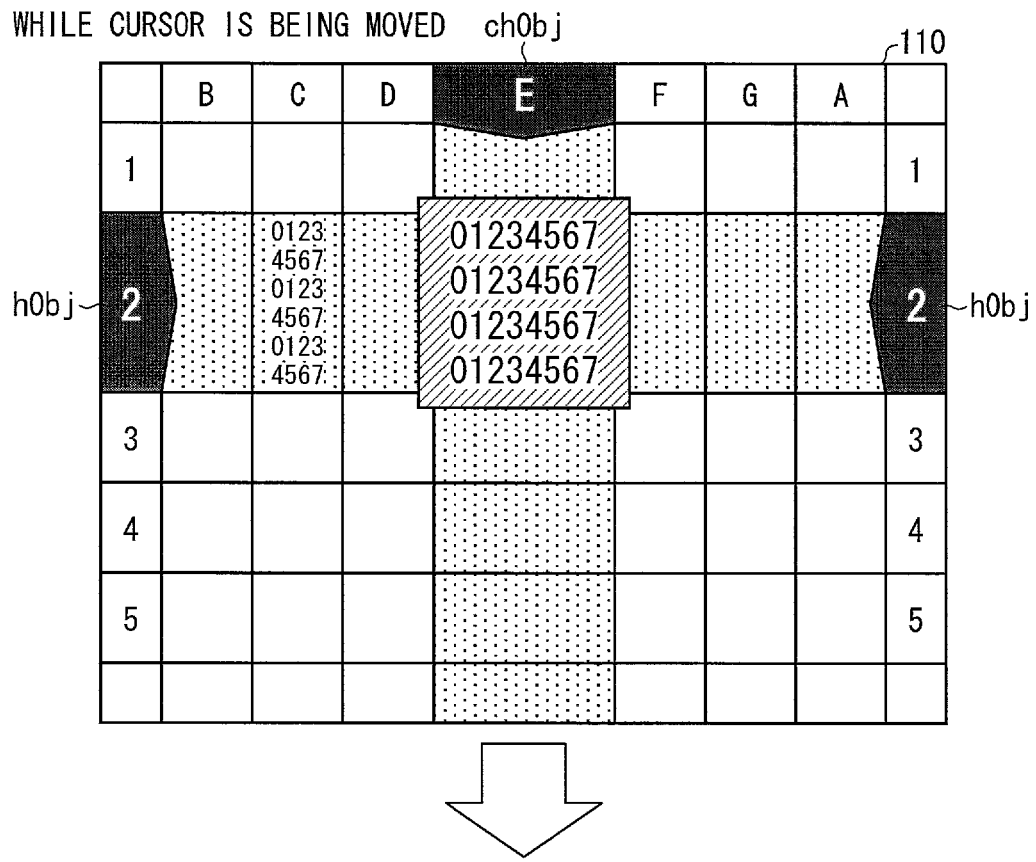
FIG. 4 is a schematic view illustrating a specific example of a display state of an electronic program table different from that of FIG. 3, which shows a state in which a cursor for selecting a program cell is being moved and a state after the cursor is moved.

Alternatively, as illustrated in FIG. 4, the CPU 118 may make UI data of the electronic program table similar to that of FIG. 2 while the move instruction of the cursor is being received, and, after the CPU 118 detects that the move instruction of the cursor is stopped, the CPU 118 may locate the time-zone item column hObj in which the target program is to be broadcasted on an immediately left side of the selected cell, and may locate the target channel item column chObj on an immediately upper side of the selected cell.

Note that the CPU 118 may have a function to analyze a tendency of programs that a user frequently watches and extract a recommended program automatically. The CPU 118 may generate statistical information of a watching frequency at which a user watches a program, and may extract, as a recommended program, a program that a user watched at a predetermined or higher frequency. In a case where the target program is a recommended program, the CPU 118 may locate, on an immediately right side of the selected cell, a message that the target program is a recommended program.

As to programs watched at a predetermined or more frequency, the CPU 118 may cause (A) a character size of the message to be large in a case where the watching frequency of a program is larger than a first threshold, (B) the character size of the message to be a medium size in a case where the watching frequency is equal to or less than the first threshold but is larger than a second threshold, (C) the character size of the message to be small in a case where the watching frequency is equal to or less than the second threshold. That is, the CPU 118 may set the character size of the message to a character size which has been set to change gradually in accordance with the watching frequency of the program.

By operating the television 1 as described above, a user can easily find, from the electronic program table, a program that the user frequently watches.

The CPU 118 may change a size of the selected cell and a degree of details of the program information to be displayed on the selected cell so that the size and the degree of details for a predetermined time period from a point at which the CPU 118 detects that the move instruction of the cursor is stopped is different from the size and the degree of details after the predetermined time period is passed.

Figure 5:
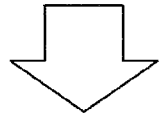
FIG. 5 is schematic views illustrating a specific example of a display state of an electronic program table, which shows a state immediately after a cursor for selecting a program cell is moved and a state in which a certain time period is passed after the cursor is moved.

For example, as illustrated in FIG. 5, the CPU 118 may make UI data of the electronic program table so that a display state for the predetermined time period from the point at which the CPU 118 detects that the move instruction of the cursor is stopped is different from a display state after the predetermined time period is passed.

In (b) of FIG. 5, large-sized numbers "01234567" in the selected cell CLf schematically represents information (a title of a program etc.) which indicates a summary of a target program, and small-sized numbers "01234567" schematically represents detailed information of the target program. The CPU 118 may make UI data of the electronic program table (electronic program table of FIG. 2) so that a selected cell CLf$_1$ is displayed in a regular size (as illustrated in the electronic program table in (a) of FIG. 5) until the predetermined time period is passed from the point at which the CPU 118 detects that the move instruction of the cursor is stopped, and, after the predetermined time period is passed, the CPU 118 may make UI data of the electronic program table (electronic program table in (b) of FIG. 5) so that more detailed program information is displayed in the large-sized selected cell.

In a case where the television 1 has a function such as a recording function and a reserved recording function, as illustrated in FIG. 5, a character string "RECORDING" is placed in a selected cell CLf$_2$ while the target program is being recorded, whereas a character string "RECORDING IS RESERVED" is placed in the selected cell CLf$_2$ in a case where the target program is reserved to be recorded.

In a case where the television 1 further has a function to automatically extract a program relevant to a key word that a user has registered in advance and the target program is a program relevant to the key word, the CPU 118 may place the key word in the selected cell CLf$_2$. For example, as illustrated in FIG. 5, in a case where a performer, such as an actor or an entertainer, is registered as the key word and the CPU 118 detects on the basis of the program information (EPG information) that the target program is a program in which the performer appears, the CPU 118 may place the name of the performer in the selected cell CLf$_2$.

Note that the CPU 118 may periodically repeat enlarging and reducing the size of the selected cell CLf$_2$ in the electronic program table in (b) of FIG. 5. Therefore, a viewer can easily know which cell in the electronic program table is selected.

Figure 6:
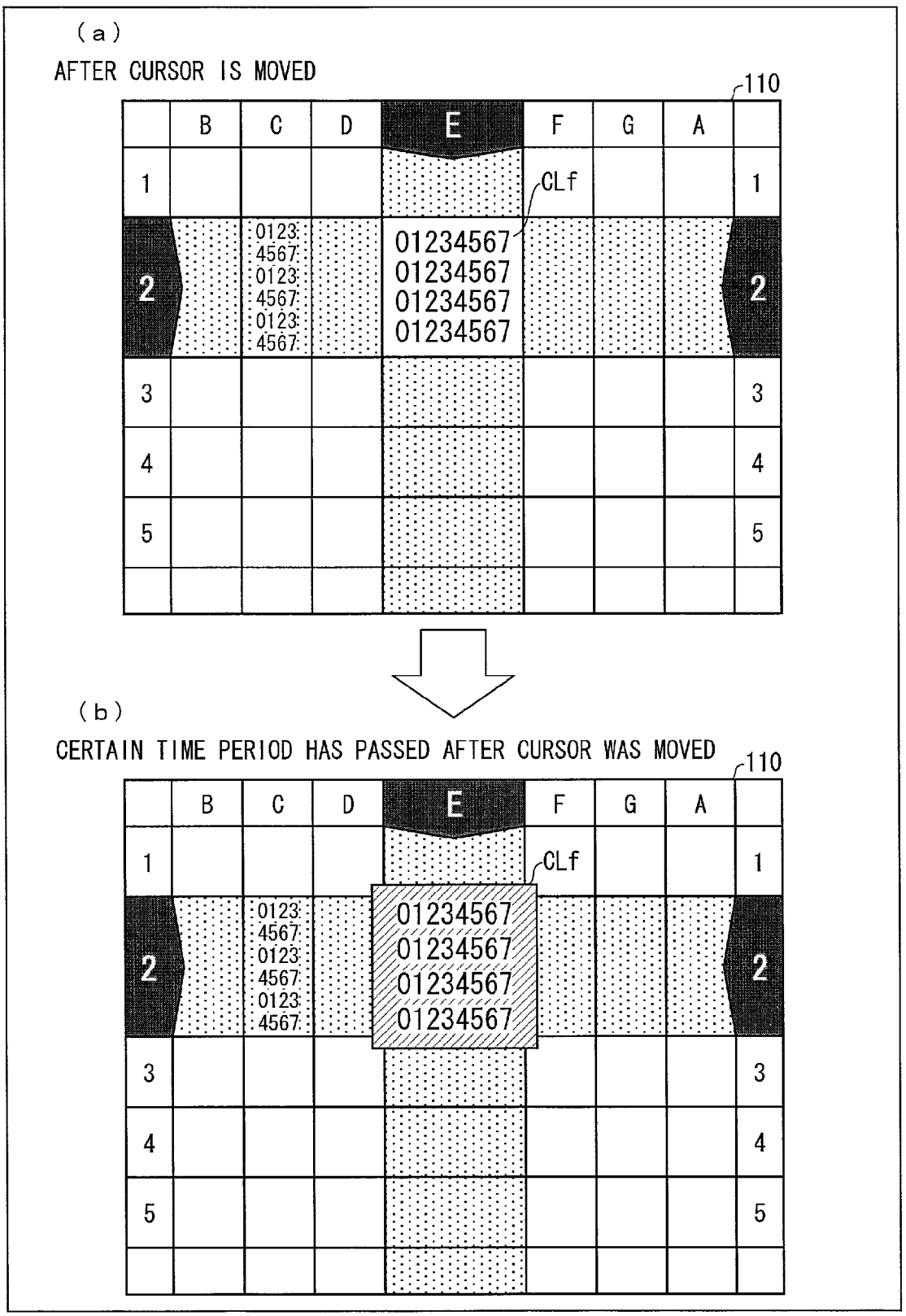
FIG. 6 is schematic views illustrating a specific example of a display state of an electronic program table different from that of FIG. 5, which shows a state immediately after a cursor for selecting a program cell is moved and a state in which a certain time period is passed after the cursor is moved.

For example, as illustrated in FIG. 6, the CPU 118 may make UI data of the electronic program table so that a display state for the predetermined time period from the point at which the CPU 118 detects that the move instruction of the cursor is stopped is different from a display state after the predetermined time period is passed.

That is, at the point at which the CPU 118 detects that the move instruction of the cursor is stopped, the CPU 118 changes, to blue, the item column chObj of the target channel and the time-zone item column hObj in which the target program is to be broadcasted in order to emphasize the item column chObj and the time-zone item column hObj (see the electronic program table in (a) of FIG. 6). Then, for the predetermined time period from the point at which the CPU 118 detects that the move instruction of the cursor is stopped, the CPU 118 causes the selected cell CLf to have the same a length as that of the program cell CLh located in the horizontal direction of the selected cell CLf. The CPU 118 causes the selected cell CLf to have the same width as those of the other program cells of the target channel.

After the predetermined time period is passed, the CPU 118 may make UI data of the electronic program table of (b) of FIG. 6 (electronic program table of FIG. 2).

(Electronic Program Table in a Case where Genre Information Indicating Genre of Program in Program Cell is Displayed)

The following description will discuss the electronic program table in a case where genre information indicating a genre of a program is displayed in the selected cell. Note that a program table (described below) has been made in view of a problem of conventional electronic program tables, i.e., a problem that a user is hard to understand a genre of a target program because a size of a genre icon is not changed even if a size of the selected cell is large.

Figure 7:
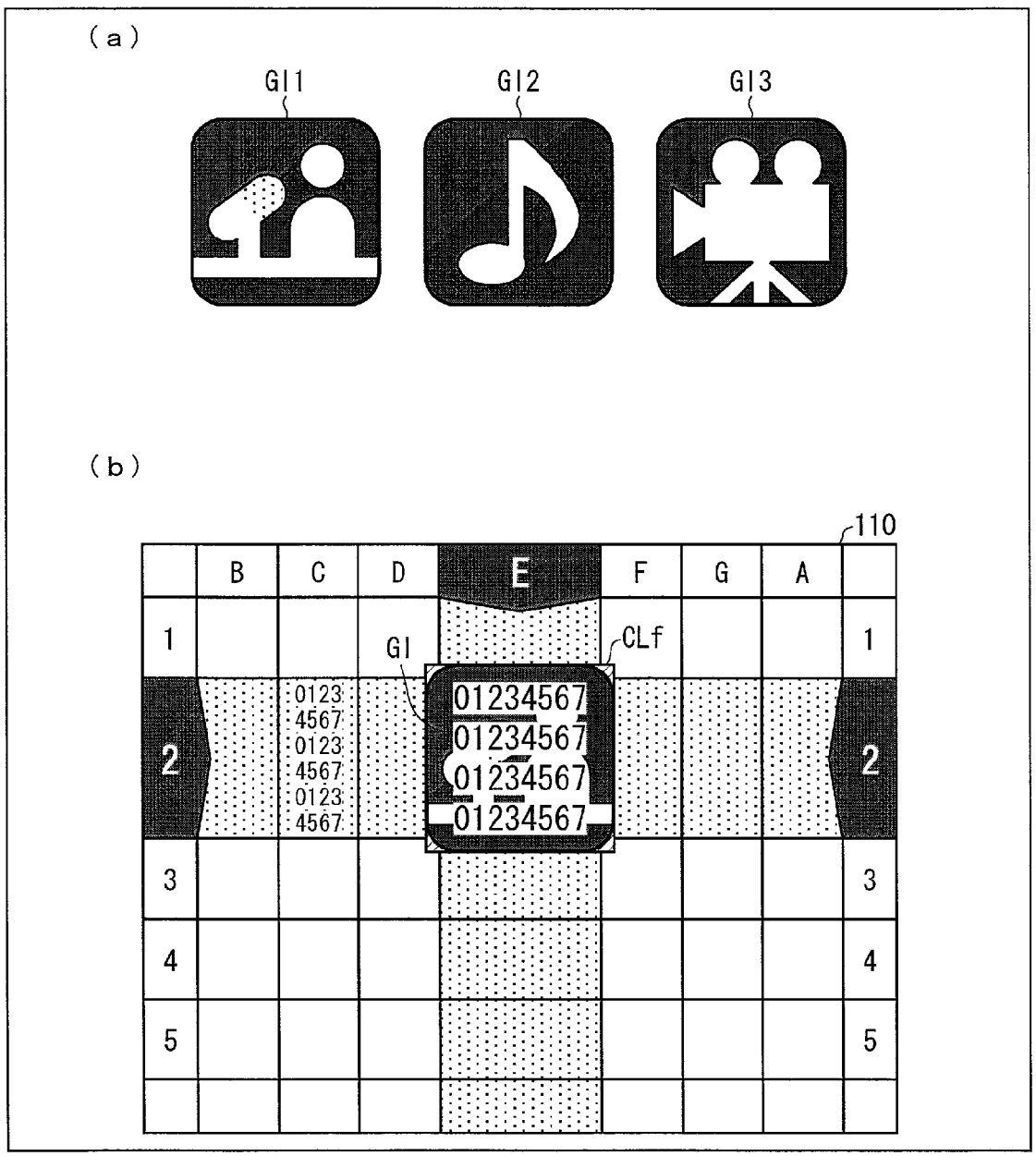
FIG. 7 is views illustrating a display state of a genre icon which is displayed in a program cell selected by a cursor (hereinafter, referred to also as a selected cell). (a) of FIG. 7 schematically illustrates the display state of the genre icon itself, and (b) of FIG. 7 schematically illustrates a specific example of a display state of an electronic program table in which the genre icon is displayed.

In this case, as illustrated in (b) of FIG. 7, the CPU 118 makes UI data of the electronic program table so that a length and a width of a genre icon to be displayed is the same as those of the selected cell. Like genre icons GI1 to GI3 in (a) of FIG. 7, icons which are different in genre from each other have been stored as genre icons in the ROM 116 in advance. Note that, in (a) of FIG. 7, the genre icon GI1 is an icon indicating that its genre is "NEWS/REPORT", the genre icon GI2 is an icon indicating that its genre is "Music", and the genre icon GI3 is an icon indicating that its genre is "Movie".

In this case, the CPU 118 may determine the size of the selected cell as follows. That is, the CPU 118 may determine the size of the selected cell so that, as illustrated in (a) of FIG. 8, the width and the length of the selected cell are same as a width a and a length b of image data of a genre icon (or only one of the width and the length of the selected cell is same as a corresponding one of those of the image data). Alternatively, as illustrated in (b) of FIG. 8, the CPU 118 may determine a width A and a length B of the selected cell in advance with use of a predetermined algorithm, enlarge or reduce the size of the image data of the genre icon so that the genre icon has the width of A and the length of B, and then locate the image data of the genre icon in the selected cell.

Figure 8:
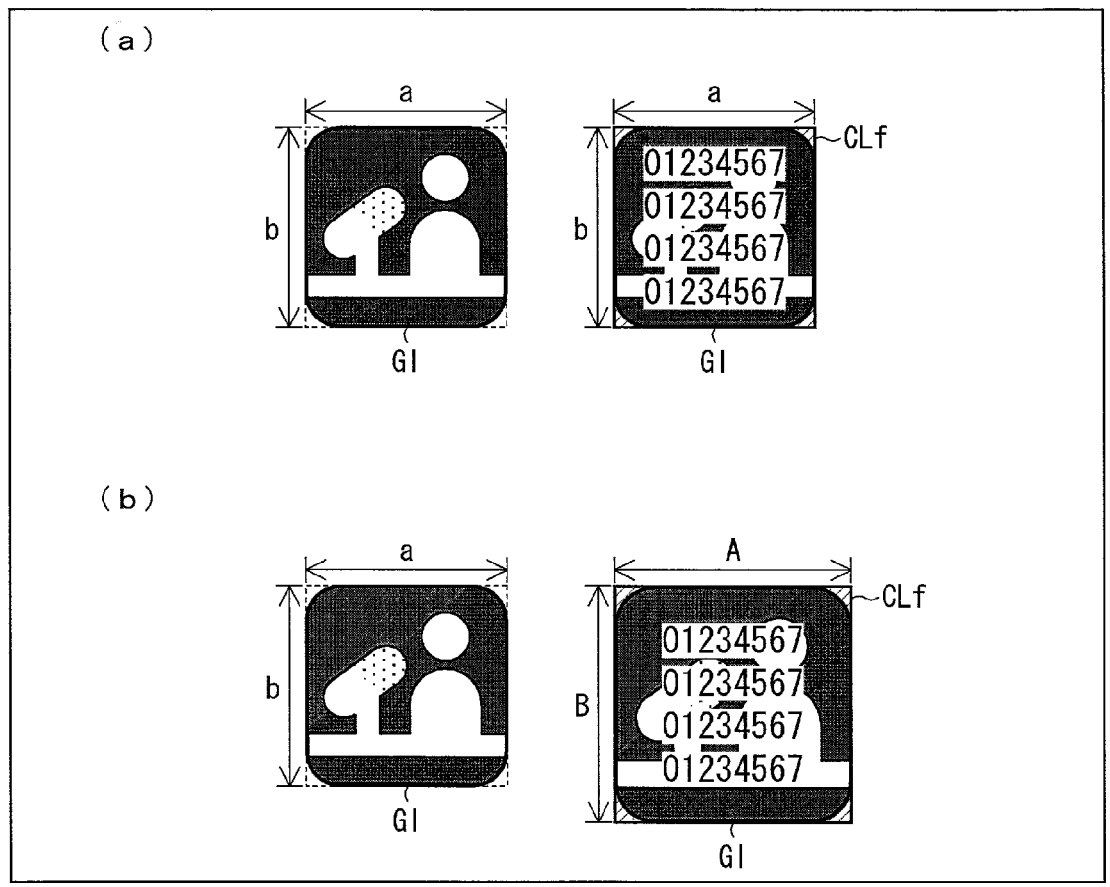
FIG. 8 is views illustrating a size of an enlarged selected cell. (a) and (b) of FIG. 8 each illustrate a specific example of a size of the enlarged selected cell.

Note that, in a case where the image data of the genre icon is enlarged or reduced in size as illustrated in (b) of FIG. 8, the genre icon is not necessary to have the width and the length same as the width A and the length B of the selected cell. That is, the width and the length of the genre icon may be set to a' and b', respectively (a' and b' are arbitrary values equal to or less than A and B, respectively).

In a case where a point at which the program cell CLh is selected by the cursor, the television 100 may immediately display a selected cell CLf in which program information is displayed on a genre icon serving as a background, or may gradually add program information into the selected cell CLf and finally display the selected cell CLf in which the program information is displayed on the genre icon serving as the background. Specifically, as illustrated in (a) of FIG. 9, the CPU 118 may locate only the genre icon in the selected cell CLf at first, and then, add the program information on the genre icon. Alternatively, as illustrated in (b) of FIG. 9, the CPU 118 may locate only the program information in the selected cell CLf at first, and then, add the genre icon as the background of the program information.

Figure 9:
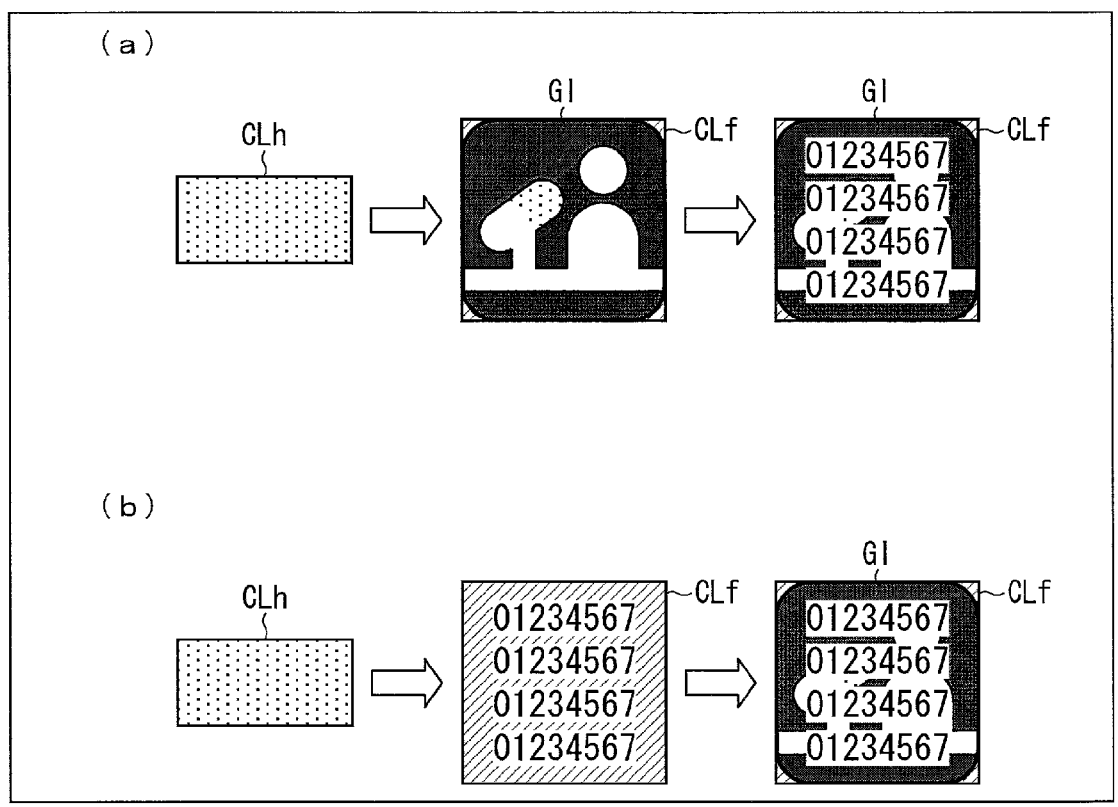
FIG. 9 is views illustrating a change of display state of a selected program cell, specifically, the change of the display state from a state immediately before the program cell is selected to a state after the program cell is selected. (a) and (b) of FIG. 9 each illustrate a specific example of the change of the display state.

In FIG. 9, a background of the character string serving as the program information is not transparent and the character string is displayed on the genre icon. However, in order to improve visibility of the genre icon, the background of the character string may be transparent and the character string may be displayed on the genre icon. In this case, in order to recognize letters easily, it is desirable to arrange colors of the letters and the genre icon so as to create a large contrast.

The genre icon, displayed as the genre information in the selected cell, has been described above. However, it is desirable that genre information be also displayed in non-selected cells (program cells CLh and CLn). Therefore, the following description will discuss, with reference to FIG. 10, the genre information to be displayed in the non-selected cells.

(a) of FIG. 10 is schematic views illustrating display states of the non-selected cells CLh and CLn. Strip regions GB1 to GB3, located in left ends of the non-selected cells exemplified by six specific examples in (a) of FIG. 10, are regions indicated by a predetermined color for each genre. In (a) of FIG. 10, slashes, horizontal lines, and vertical lines drawn in respective strip regions indicate that the strip regions GB1 to GB3 have different colors. Note that, as illustrated in (b) of FIG. 10, the television 1 desirably display the genre information on all the non-selected cells of the electronic program table.

Various display states of the electronic program table displayed by the television 1 have been described above with reference to FIG. 2 to FIG. 10. In FIG. 2 to FIG. 10, the program cells are located in matrix. That is, each of the electronic program tables of FIG. 2 to FIG. 10 indicates a program schedule such that one-hour programs are broadcasted at all the channels in all the time zones. However, such a program schedule is not general.

That is, even if programs are broadcasted in the same time zone, as a matter of course, start times and finish times of the programs at respective channels are generally different from each other (see the electronic program tables of (a) of FIG. 11 and (b) of FIG. 11). That is, as illustrated in the electronic program tables of (a) of FIG. 11 and (b) of FIG. 11, the program cells of the electronic program tables are generally arranged like tiles.

In such a general electronic program table, the CPU 118 may select, from the program cells located in the horizontal direction of the selected cell, a region(s) whose background color is to be changed to light blue as follows.

That is, in a case where all program cells whose programs are at least partially broadcasted at other channels in a broadcast time period of a target program, the CPU 118 may change, to light blue, only a color of regions corresponding to the broadcast time period of the target program among all regions of the program cells (see (a) of FIG. 11). For example, the channel G has a program cell whose broadcast time period is from 13:30 to 14:30, however, only a region from 14:00 to 14:30 corresponding to the broadcast time period of the target program may be indicated by light blue.

Alternatively, in a case where broadcast time periods (including a broadcast start time) of programs of all program cells at other channels include a broadcast start time of the target program, the CPU 118 may color a whole region of each of the program cells with light blue (see (b) of FIG. 11).

Meanwhile, a length between a start time and a finish time of a selected program is not necessarily same as a length of a time indicated on both left and right ends of the electronic program table. In this case, a region to be colored with deep blue may be selected from time zones including a broadcast time period of the selected program as follows.

That is, regardless of a segment per hour in a time display region, a time display region corresponding to the broadcast time period from the start time to the finish time of the selected program may be colored with deep blue. It is possible to determine the region to be colored with deep blue by calculating a length in a time-axis direction in proportion to fractions (0(zero) minute to 60 minutes) of the start time and the finish time.

As an alternative, among time zones parceled out into hours, all time zones at least partially including the start time and the finish time of the selected program may be colored with deep blue.

As another alternative, among time zones parceled out into hours, time zones including a predetermined or more length of broadcast time period of the selected program may be colored with deep blue.

(Function Menu)

Note that the television 1 may have a function menu for adjusting a display state of an electronic program table. A specific example of the function menu will be described below with reference to FIG. 12 and FIG. 13.

FIG. 12 is a schematic view illustrating the electronic program table in a state in which a function menu is popped up. FIG. 13 is a schematic view illustrating the electronic program table in a state in which another function menu is popped up. As illustrated in FIG. 13, the function menu has items of a character size setting, an icon size setting, length and color settings of a time axis, width and color settings of a program axis, and a detailed setting. A user selects an item to be set with use of a remote controller and moves a knob of a slide bar located on a right side, thereby adjusting a setting value of each item.

In a case where the character size setting is performed, the CPU 118 changes, on the basis of a location of the knob, a character size of program information to be displayed in the selected cell.

In a case where the icon size setting is performed, the CPU 119 change a size of a genre icon to be displayed in the selected cell on the basis of a location of a knob of a slide bar. As described above with reference to FIG. 8, the CPU 118 controls a length and a width of a display size of a genre icon to be same as those of the selected cell, so that it can be said that the icon size setting is also a setting of the size of the selected cell (i.e., setting of values of A and B in (b) of FIG. 8).

In a case where the length of the time axis is set, the CPU 118 changes, on the basis of a location of a knob of a slide bar, a length of the time-zone item column hObj corresponding to the time zone in which the target program is broadcasted. In a case where a depth of a color of the time axis is set, the CPU 118 adjusts the depth of blue in the time-zone item column hObj on the basis of a location of a knob of a slide bar.

In a case where the width of the program axis is set, the CPU 118 changes a width of the channel item column chObj on the basis of a location of a knob of a slide bar. In a case where the depth of the color of the time axis is determined, the CPU 118 adjusts a depth of blue in the channel item column chObj on the basis of a location of a knob of a slide bar.

Note that, in a case where the details setting is selected, the CPU 118 is configured to generate a submenu for use in setting of various detailed items and display the submenu on the LCD 110.

Alternatively, the television 1 may have a function menu such as that in the electronic program table of FIG. 12.

As illustrated in FIG. 12, items of easy-to-find search, reservation list display, date and time change, the character size setting, subchannel display, and the details setting are listed in the function menu. The easy-to-find search means a function of searching a program which satisfies a search criterion(s) set by a user. Specifically, in a case where easy-to-find search is carried out, the television 1 displays a background of a program cell of a program which satisfies the search criterion(s) in a color indicating that the program satisfies the search criterion(s), or the television 1 displays, on a program cell of a program which satisfies the search criterion(s), an icon indicating that the program satisfies the search criterion(s). Note that three search criteria can be set at the maximum as the search criterion(s).

In a case where the easy-to-find search is selected from the function menu with use of the remote controller, the television 1 displays, on the LCD 110, a list display 1000 (such as that in FIG. 23), displaying a search criterion 1010 currently set, and a list 1020 of programs satisfying the search criterion.

In a case where the reservation list display is selected with use of the remote controller, the CPU 118 generates a reservation list which is a list of programs which is reserved to be recorded, and displays a display dialog of the reservation list on the LCD 110 so that the display dialog slides into the screen from a left side thereof.

In a case where the date and time change is selected with use of the remote controller, the CPU 118 generates a setting dialog for allowing a user to set a range of date and time of programs whose program information should be displayed on the LCD 110, and displays the setting dialog so that the setting dialog slides into the screen from a left side thereof. When the range of date and time is set via the setting dialog, the CPU 118 displays, on the LCD 110, program information of a program to be broadcasted within the range of date and time thus set.

In a case where the character size setting is selected with use of the remote controller, the CPU 118 generates a dialog for allowing a user to adjust the character size of the program information of each program cell, and displays the dialog in a lower left corner of the LCD 110.

In a case where the subchannel display is selected with use of the remote controller while a program table of terrestrial broadcasting is being displayed, the CPU 118 generates an electronic program table in which program information of subchannels in respective broadcasting stations are displayed, and displays the electronic program table on the LCD 110.

In a case where the details setting is selected, the CPU 118 is configured to generate a submenu for use in setting of various detailed items and display the submenu on the LCD 110.

(Method of Determining the Number of Displayable Lines in Each Program Cell of Electronic Program Table)

In a case where the television 1 displays the electronic program table, and in a case where a move instruction of the cursor of a program cell is received, the number of displayable lines in each program cell may be determined by a predetermined algorithm. This algorithm will be described below by citing specific examples with reference to FIG. 16 to FIG. 22.

(a) of each of FIGS. 16 and 17 is a table showing a broadcasting schedule of programs to be broadcasted at a certain channel (which is a different from a channel at which a program of the selected cell is to be broadcasted) between 0 o'clock(i.e. 12 o'clock at night) and 1 o'clock. (b) and (c) of each of FIGS. 16 and 17 are schematic views each illustrating a display state of program cells of programs starting between 0 o'clock and 1 o'clock at the same channel. (b) illustrates a display state in a case where the program of the selected cell starts in a time zone other than the time zone between 0 o'clock and 1 o'clock, and (c) illustrates a display state in a case where the program of the selected cell starts between 0 o'clock and 1 o'clock.

(a) of each of FIGS. 18 to 20 is a table showing a broadcasting schedule of programs to be broadcasted at a certain channel (which is different from a channel at which the program of the selected cell is to be broadcasted) between 0 o'clock and 2 o'clock. (b) of each of FIGS. 18 to 20 is a schematic view illustrating a display state of the program cells of the programs starting between 0 o'clock and 2 o'clock at the same channel. Specifically, (b) illustrates a display state in a case where the program of the selected cell starts in a time zone other than the time zone between 0 o'clock and 2 o'clock. Note that, as to two round-cornered rectangles drawn with a broken line in (b) of each of FIGS. 18 to 20, a region surrounded by the round-cornered rectangle on an upper side indicates a display region between 0 o'clock and 1 o'clock, meanwhile, the round-cornered rectangle on a lower side indicates a display region between 1 o'clock and 2 o'clock.

FIG. 21 illustrates comparison between a display state of a program cell before the program cell is selected from program cells of programs which start at the same channel in the time zone in which the program of the selected cell is broadcasted and a display state after the program cell is selected. Note that, in FIG. 21, the selected cell is a program cell surrounded by the round-cornered rectangle of a solid line. In FIG. 16 to FIG. 21, "L2", "L3", etc. expediently represent a character string on a second line, a character string on a third line, etc. in each program cell.

FIG. 22 is a view exemplifying a UI of an electronic program table that the television 1 displays after the television 1 determines the number of text lines to be displayed in each program cell with use of the algorithm. Note that "○ ○ . . . ○" in FIG. 22 expediently represents actual character strings (indicating contents of programs etc.) displayed in the electronic program table.

The CPU 118 controls that a program cell(s) of a program(s) at each channel which start(s) in a time zone in which the program of the selected cell is broadcasted have (has) a display region of M lines (e.g., M=8 as illustrated in (c) of FIG. 16) in the electronic program table. Then the CPU 118 controls that another or other program cell(s) of a program(s) in another or other time zone(s) have(has) a display region of N lines (N<M, e.g., N=4 as illustrated in (b) of FIG. 16) in the electronic program table. For example, in a case where the selected cell is a program cell of a program broadcasted from 2 o'clock to three thirty, the CPU 118 controls that a program cell(s) at each channel between 2 o'clock and 3 o'clock has (have) the number of displayable lines of M lines in total, and a program cell(s) between 3 o'clock and 4 o'clock has(have) the number of displayable lines of N lines in total.

Then, the CPU 118 carries out the following process with respect to each time zone at each channel. Note that, in the following description, a time zone focused in the description will be referred to also as "target time zone". Hereinafter, the following description will discuss on the assumption that the target time zone is the time zone in which the program of the selected cell starts, except where specifically noted. The CPU 118, however, carries out a substantially similar process (i.e., a process understood by a person skilled in the art by changing "M" to "N" in the following description) also in a case where the target time zone is not the time zone in which the program of the selected cell starts.

Specifically, the CPU 118 determines whether or not P program(s) (as is clear from (a) of FIG. 16, P=4 in the example of FIG. 16 where the target time zone is between 0 o'clock and 1 o'clock) to be broadcasted in the target time zone has(have) not less than five minutes as a first time period value. The first time period value indicates a length of a broadcast time period of a program whose broadcast start time is in the target time zone. In a case where the program is continued on a time zone before the target time zone, the first time period value indicates a length of a time period from a start of the target time zone to a broadcast finish time of the program. In a case where the CPU 118 determines that P' programs (P'≤P, P'=4 in the example of FIG. 16) has(have) not less than five minutes as the first time period value, the CPU 118 allots one line, as the number of displayable lines of a program cell, to the P' program or to each of the P' programs. Note, however, that, in a case where the number of M programs is less than the number of P' programs (P'>M), the CPU 118 allots one line, as the number of displayable lines of a program cell, to the M program or to each of the M programs which has(have) been selected from P' programs in ascending order of broadcast start time.

In a case where M lines in total are allotted to the M programs, the CPU 118 displays program cells of the M program(s), which program cells each include a display region of one line, and terminates the process. In other cases (i.e., in a case where L line(s) of the M lines have not been allotted yet), the CPU 118 continues the process. In the example of FIG. 16, in a case where the target time zone is not the time zone in which the program of the selected cell starts, four lines in total are allotted to the four programs, and therefore, the CPU 118 displays the four program cells as illustrated in (b) of FIG. 16, and terminates the process.

Then, the CPU 118 calculates a second time period value of the P program(s). The second time period value of a program indicates a length of a broadcast time period of the program in a target time zone. For example, in a case where the target time zone is between 2 o'clock and 3 o'clock, the second time period value of a program broadcasted from two forty-five to three thirty is fifteen minutes.

Thereafter, the CPU 118 allots remaining L line(s) (L=4 in the example of FIG. 16) to the program in the target time zone. Specifically, in a case of L=M (i.e., in a case of P'=0), the M programs are selected in ascending order of second time period values thus calculated, and the CPU 118 displays program cells of the M programs having a display region of one line and terminates the process. Meanwhile, in a case of L<M (that is, in a case of P'>0), the CPU 118 substitutes L for a variable L', and repeats an allotting process (described below) (loop process) until the remaining L line(s) is(are) all allotted (i.e., the value of L' becomes zero).

A program having the largest second time period value (variable Duration) among program(s) which is(are) not selected in the loop process is selected, and a value obtained from a formula "Duration/60×M" is rounded up. Then, in a case where a rounded-up value Q is larger than L', L' line(s) is(are) additionally allotted, as the number of displayable lines of a program cell, to the selected program. Then zero is substituted for L', and the loop process is terminated.

Meanwhile, in a case where Q is equal to or less than L', (Q−1) lines are allotted, as the number of displayable lines of a program cell, to the selected program, and (L'−Q+1) is substituted for L'.

The above allotting process is repeated until a value of the L' becomes zero. Then, the CPU 118 displays a program cell(s) of a program(s) so that the program cell(s) has(have) a display region of at least one allotted lines. And the CPU 118 terminates the allotting process.

In the example of FIG. 16, the CPU 118 selects a program AAAA in a first allotting process. Then, based on a result of calculation Q (=6)>L'(=4), the CPU 118 further allots L' lines to the program AAAA, and terminates the loop process. As a result, the CPU 118 displays four program cells as illustrated in (c) of FIG. 16, and terminates the process.

By carrying out the above process with respect to each time zone at each channel, the CPU 118 displays (or renews display of) the electronic program table.

As a result of the above process, in a case where a program is broadcasted over two time zones, there are two cases: (i) a program cell of the program is located only in a display region in a time zone in which the program starts to be broadcasted; or (ii) the program cell is located over display regions in the two time zones.

A program DDDD (illustrated in (a) of FIG. 18), which is broadcasted from 0:55 (i.e. 12:55 at night) to 1:05, has a first time period value of ten minutes in a case where the target time zone is between 0 o'clock and 1 o'clock, and has a first time period value of five minutes in a case where the target time zone is between 1 o'clock and 2 o'clock. That is, a display region for a program cell of the program DDDD can be allotted to a display region between 0 o'clock and 1 o'clock and a display region between 1 o'clock and 2 o'clock. Therefore, as illustrated in (b) of FIG. 18, the program cell of the program DDDD is located over the display regions in the two time zones (between 0 o'clock and 1 o'clock and between 1 o'clock and 2 o'clock). Similarly, a program DDD (illustrated in (a) of FIG. 19), which is broadcasted from 0:56 to 1:10, has a first time period value of fourteen minutes in a case where the target time zone is between 0 o'clock and 1 o'clock, and has a first time period value of ten minutes in a case where the target time zone is between 1 o'clock and 2 o'clock. That is, a display region for the program cell of the program DDD can be allotted to a display region between 0 o'clock and 1 o'clock and a display region between 1 o'clock and 2 o'clock. Therefore, as illustrated in (b) of FIG. 19, the program cell of the program DDD is located over the display regions in the two time zones (between 0 o'clock and 1 o'clock and between 1 o'clock and 2 o'clock).

Meanwhile, a program DDDD (illustrated in (a) of FIG. 20), which is broadcasted from 0:56 to 1:04, has a first time period value of eight minutes in a case where the target time zone is between 0 o'clock and 1 o'clock, and has a first time period value of four minutes in a case where the target time zone is between 1 o'clock and 2 o'clock. That is, a display region for the program cell of the program DDDD can be allotted only to a display region between 0 o'clock and 1 o'clock. Therefore, as illustrated in (b) of FIG. 20, the program cell of the program DDDD is located only in the display region between 0 o'clock and 1 o'clock which is a time zone in which the program DDDD starts to be broadcasted.

Note that, as to a program to which no displayable line is allotted as a result of the above process with respect to each time zone at each channel, the CPU 118 may carry out anchor display with respect to a program cell of the program in a lower end of a display region in a time zone in which the programs starts to be broadcasted. Specifically, the CPU 118 may display the program cell of the program so that an inside of the program cell has a length of 1 dot (a whole cell has a length of 3 dots).

In the example of FIG. 17, P is 12 as is clear from (a) of FIG. 17, and M (=8) programs, which have been selected in ascending order of broadcast start time, are allotted M lines in total. As illustrated in (c) of FIG. 17, the CPU 118 may carry out anchor display with respect to program cells of remaining four programs which have been allotted no displayable line. In a case where the target time zone is not the time zone in which the program of the selected cell starts, N (=4) programs, which have been selected in ascending order of broadcast start time, can be allotted N lines in total. As illustrated in (b) of FIG. 17, the CPU 118 may carry out anchor display with respect to program cells of remaining eight programs which have been allotted no displayable line.

The CPU 118 may change a length of a strip region (the strip regions GB1 to GB3 described above), which is in a left end of a non-selected cell and is indicated by a color on the basis of genre, in accordance with the number of displayable lines of the non-selected cell.

In a case where a program cell whose number of displayable lines is less than N lines, the CPU 118 may carry out the above process at each channel in each time zone, and then, may carry out a process of enlarging the program cell (selected cell) to a size of a display region of N lines and displaying the program cell thus enlarged.

More specifically, in a case where a display region from an upper end of the selected cell to a lower end of a display region in the target time zone has N or more lines, the CPU 118 may enlarge the selected cell in a lower direction, and may display the selected cell thus enlarged. In a case where the display region from the upper end of the selected cell to the lower end of the display region in the target time zone has a display region of (N−1) or less lines, the CPU 118 may enlarge the selected cell so that a lower end of an enlarged selected cell correspond with the lower end of the display region in the target time zone. In the example of FIG. 21, a program cell (selected cell) of a program B has two displayable lines before the program cell is selected. As is clear from FIG. 21, a display region has 6 (>N=4) lines from the upper end of the selected cell which has not been enlarged yet to the lower end of the display region in the target time zone. Therefore, as illustrated in FIG. 21, the CPU 118 carries out a process of (i) enlarging the selected cell in a lower direction so that the selected cell has a display region of four lines and (ii) displaying the selected cell thus enlarged.

Note that the television 1 may store data of two kinds (large and small) of genre icons indicating the same genre. That is, the television 1 may store the following two kinds of the genre icons for each genre: a large genre icon having a length of M lines of text; and a small genre icon having a length of N lines of text. In a case where an enlarged selected cell has M or more displayable lines, the CPU 118 may display the large genre icon in the selected cell, and, in a case where the enlarged selected cell has less than M (but not less than N) displayable lines, the CPU 118 may display the small genre icon in the selected cell.

In the electronic program table displayed with use of the above algorithm, each program cell in the table is basically displayed at a location in accordance with a broadcast start time of a program of the each program cell (specifically, about what time the program starts to be broadcasted), and a length of the each program cell is substantially in proportion to a length of a broadcast time period of the program. Therefore, a user can intuitionally grasp a start time of the program and a length of a broadcast time period of the program with high accuracy by roughly recognizing a location in an upper end of the program cell and a length of the program cell.

It is desirable that the CPU 118 display an electronic program table so that a character string on the ith (i=1, 2, . . . ) line of a display region in a time zone at a channel is horizontal to character strings on the ith line of display regions in the same time zone at other channels. If so, an electronic program table to be displayed gives a systematic impression to a user, so that the user can understand the electronic program table more easily.

(Additional Matter 1)

Note that, in the above embodiment, the television 1 has been cited as an embodiment of the display control device of the present invention, however, the present invention is not limited to the television 1. For example, a PC including a CPU which is similar to the CPU 118 of the television 1, i.e., which performs display control of an electronic program table, falls within the scope of the present invention.

The genre icon has been located inside the selected cell in the above embodiment, however, an image relevant to a program, other than genre icon, may be located inside the selected cell. That is, in a case where the television 1 displays the image in the selected cell, the television 1 may locate the image inside the selected cell so that a length and a width of the image correspond with those of the selected cell. Note that examples of the image encompass an icon for use in the "easy-to-find search" (described above), an icon of content which has never been replayed yet in a series of programs recorded by use of a series recording function, and an icon indicating a degree of a user's favorite.

A specific example of the icon for use in the easy-to-find search may indicate what number search criterion (i.e., first, second, or third search criterion) of three search criteria is used to search for a target program, or may indicate what kind of search criterions is used to search for the target program. For example, in a case where the easy-to-find search is performed with "subtitled broadcasting program" as a search criterion, the icon may be an icon indicating that the target program is subtitled broadcasting program.

As the icon of the content which has never been replayed yet in the series of the programs recorded by use of the series recording function, the icon may be displayed as follows: in a case where not all content is replayed among recorded 1st to Nth episodes of a serial content broadcasted at regular intervals, an icon indicating that, among the recorded episodes, there is one or some episodes which have not been replayed yet may be displayed in a program cell in a broadcast time period in which the (N+1)th episode of the serial content is broadcasted. For example, in a case where the first episode and the second episode have been recorded and have not been replayed yet, the icon indicating that, among recorded episodes, there is one or some episodes which have been recorded but have not been replayed yet may be displayed in a program cell in a broadcast time period in which the third episode of the content is broadcasted.

In a case where the television 1 is configured to determine, on the basis of statistical information generated from the user's viewing history, a degree of a user's favorite on each program by N stages, or in a case where the television 1 is configured so that the user can arbitrarily determine the degree of the user's favorite on the each program, the icon indicating the degree of a user's favorite may indicate in what stage the target program is in terms of the degree of the user's favorite.

Note that the above images of the icons are not limited to still images, and may be animation images, images whose color changes as time is passed, or images configured to be displayed in an enlarged size as if the images jumps out of a program cell.

(Additional Matter 2)

In the above embodiment, the CPU 118 changes, to light blue, the background colors of both the program cells located in the vertical direction of the selected cell CLf and the program cells CLh located in the horizontal direction of the selected cell CLf. However, the CPU 118 may change the background color of only one of the horizontal program cells and vertical program cells to light blue.

The CPU 118 does not need to change the background colors of all the program cells CLh to the same color. For example, the CPU 118 may gradate background colors of continuously located program cells CLh so that the background colors of the program cells CLh are deeper (or paler) as the program cells CLh are closer to the selected cell CLf.

In the above embodiment, the CPU 118 is configured to change, to light blue, a background color of a program cell group located like a cross shape around the selected cell CLf. However, the CPU 118 may be configured to change a background color of only a part of the program cell group located like a cross shape, specifically, a part of the program cell group located on an upper left corner side of a screen (i.e., a program cell group located like an L shape) is colored with light blue, whereas a part of the program cell group located on an lower right corner side of the screen is not colored. The CPU 118 may be also configured to change a background color of only a part of a program cell group located like an L shape, specifically, a part of the program cell group located along a horizontal direction (second horizontal strip region) or a vertical direction (second vertical strip region) is colored with light blue. Further, the CPU 118 may be also configured to change a background color of only a part of the program cell group located like a cross shape, specifically, a part of the program cell group located along a horizontal direction (third horizontal zone) or a vertical direction (third vertical zone) is colored with light blue. Furthermore, the CPU 118 may be also configured to change, to light blue, a background color of a program cell group located like a T shape around the selected cell CLf.

As illustrated in FIG. 14, in a case where the CPU 118 changes the background color of only the program cell group located in the vertical direction of the selected cell to light blue, the CPU 118 may change, to deep blue, only a background color of the target channel item column chObj located in the vertical direction of the selected cell among item columns indicating channels and item columns indicating broadcast time zones. Similarly, in a case where the CPU 118 changes only the background color of the program cell group located in the horizontal direction of the selected cell to light blue, the CPU 118 may change, to deep blue, only a background color of the broadcast time-zone item columns hObj among item columns indicating channels and item columns indicating broadcast time zones.

In a case where the CPU 118 changes only the background color of the program cell group located in the horizontal direction of the selected cell to light blue, a region between the broadcast time-zone item columns hObj and the selected cell CLf is displayed in light blue. Therefore, the user can easily understand a broadcast time period of a target program. Further, the user can easily identify programs broadcasted at other channels in a time zone in which the target program is broadcasted.

In a case where the CPU 118 changes only the background color of the program cell group located in the vertical direction of the selected cell to light blue, a region between the item column chObj of a channel name and the selected cell CLf is displayed in light blue. Therefore, a user can easily understand a channel of a target program. Further, the user can easily identify programs broadcasted in other time zones at a channel at which the target program is broadcasted.

In the above embodiment, the background color of the program cell group in the program cells CLh is changed to light blue. However, as a matter of course, the present invention is not limited to a configuration in which such a process is carried out. That is, the CPU 118 is required only to form UI data of an electronic program table such that a display state of a program cell group of the program cells CLh and a display state of a program cell group of the program cell CLn are different from each other.

(Additional Matter 3)

In the above embodiment, the CPU 118 sets a length of a selected cell CLf larger than those of program cells CLh located in the horizontal direction of the selected cell CLf, and sets a width of the selected cell CLf larger than a width of the program cells CLh located in the vertical direction of the selected cell CLf, however, the present invention is not limited thereto. That is, as illustrated in the upper electronic program table in FIG. 6, the CPU 118 may set a length of the selected cell CLf same as those of the program cells CLh located in the horizontal direction of the selected cell CLf and a width of the selected cell CLf same as those of the program cells CLh located in the vertical direction of the selected cell CLf.

In a case where television 1 is configured as described above, a function menu does not necessarily need to provide width settings of a time axis and a program axis as setting items.

It is because a setting of the icon size also includes the width settings of the time axis and the program axis. That is, in a case where the television 1 is configured as described above, as is clear from the upper electronic program table in FIG. 6, the length of the selected cell CLf is equal to the length of the time-zone item column hObj, and the width of the selected cell CLf is equal to the width of the channel item column chObj. As described in the embodiment, the width of a genre icon is equal to the width of the selected cell CLf, and a length of the genre icon is equal to the length of the selected cell CLf, so that it is possible to adjust the length of the time-zone item column and the width of the channel item column chObj by setting the icon size of the genre icon.

(Additional Matter 4)

In the television 1, the CPU 118 may adjust a zooming ratio of the electronic program table on the basis of a distance detected by the human sensor 121 between the television 1 and a user. That is, the CPU 118 may reduce the electronic program table as the distance between the television 1 and the user becomes small, whereas the CPU 118 may enlarge the electronic program table as the distance between the television 1 and the user becomes large.

With this, the electronic program table to be displayed in the LCD 110 is enlarged in a case where the user is far away from the television 1 (i.e., a character size of program information is also enlarged). The user is therefore possible to easily grasp contents of programs even if the user is far away from the television 1. On the contrary, the electronic program table is reduced in size in a case where the user is near the television 1 (i.e., an information amount of the program information displayed in the LCD 110 at one time is increased). Therefore, the user can quickly grasp more program information in a case where the user is near the television 1.

In the television 1, the CPU 118 may adjust the size of the selected cell CLf on the basis of the distance detected by the human sensor 121 between the television 1 and the user. That is, the CPU 118 may set the size of a selected cell CLf so that the selected cell CLf is relatively smaller as the distance between the television 1 and the user is smaller, whereas the CPU 118 may set the size of the selected cell CLf so that the selected cell CLf is relatively larger as the distance between the television 1 and the user is larger.

The user can therefore easily grasp program information of the target program even if the user is far away from the television 1.

The CPU 118 may change, in accordance with brightness sensed by the illuminance sensor 122 (e.g., RGB sensor or OPC sensor), a depth (display luminance) of colors of item columns indicating channels and item columns indicating time zones. Note that the display luminance may be controlled by adjusting luminance of an image signal in the image processing circuit 108, or may be controlled by performing local control on an LED backlight provided in the LCD 110.

The CPU 118 may generate an electronic program table such that a display state of the program cells CLh is changed in accordance with a user who uses the television 1. For example, the CPU 118 may generate an electronic program table such that the program cells CLh are displayed in different display states depending on a user (father, mother, a child, or a grandfather). The CPU 118 may also generate an electronic program table such that a display state of the program cells CLh is changed in accordance with which kind of electronic program table is to be displayed (an electronic program table for terrestrial broadcasting, one for BS broadcasting, or one for CS broadcasting).

(Additional Matter 5)

A sight sensor, which is capable of sensing a location on the LCD 110 at which a user is looking, may be provided in the television 1. In a case where the sight sensor senses that, within a range of a program cell of a certain program, there is a location at which a user is looking for a predetermined time period, the CPU 118 may set the program cell as a selected cell. The CPU 118 may also change, to light blue, background colors of program cell groups located in vertical and horizontal directions of the selected cell.

In a case where the sight sensor senses that, within a range of a program cell of a certain program, there is a location at which a user is looking for a predetermined time period, the CPU 118 may set a character size of program information in the program cell after the predetermined time period is passed so that the character size becomes gradually large until the user stops looking at locations within the range of the program cell. Then, in a case where the sight sensor senses that a location at which the user is looking is out of the range of the program cell, the CPU 118 may change the character size to an original size.

In the above embodiment, the CPU 118 may set a width of the selected cell relatively larger than those of the program cells CLh at a target channel in other time zones, whereas the CPU 118 may set a length of the selected cell relatively larger than those of the program cells CLh of programs at other channels in a time zone in which the target program is broadcasted. The CPU 118 may reduce a size of the selected cell after a predetermined time period is passed from such a process. That is, the CPU 118 may cause the width of the selected cell to be equal to those of the program cells CLh of the programs in other time zones at the target channel, whereas the CPU 118 may cause the length of the selected cell to be equal to those of the program cells CLh of the programs at other channels in a time zone in which the target program is broadcasted. A specific length of the predetermined time period may be set by a user via the details setting in the function menu.

(Additional Matter 6)

It is desirable that the CPU 118 set a size of the selected cell CLf such that at least four lines of character strings of program information can be displayed in the selected cell CLf. It is also desirable that the CPU 118 set a size of non-selected cells such that at least a single line of a character string can be displayed in the selected cell CLf.

(Additional Matter 7)

The CPU 118 may display a genre icon to be displayed as animation in the selected cell CLf. For example, the genre icon may be displayed as animation with a plot, like icons for use in decoration mails of mobile phones.

(Additional Matter 8)

Note that a size of each program cell in an electronic program table, which size is set by the CPU 118, is not limited to the size described in the above embodiment. That is, the CPU 118 may determine a size of each program cell in an electronic program table by use of the means illustrated in FIG. 16 to FIG. 24.

(Additional Matter 9)

Note that, in the description of the above embodiment with reference to FIG. 7, there have been described a configuration in which (i) a background color of the program cells CLh located in horizontal and vertical direction of the selected cell (CLf) is changed to light blue and (ii) a length and a width of a genre icon to be displayed in the selected cell is identical with those of the selected cell. Note, however, that, in order to cause a user to grasp a genre of a target program more easily than a conventional one, the CPU 118 does not need to change the background color of the program cells CLh to light blue and may color the background color of the program cells CLh with white similar to the background color of the program cell CLn.

(Program etc.)

Finally, display control performed by a display control device can be configured by means of hardware logic. Alternatively, the display control performed by the display control device can be realized by software with use of a CPU (central processing unit) as in the television 1.

Specifically, program codes (execution mode program, intermediate code program, and source program) of a control program that realizes controls of the television 1 are stored to be readable by a computer. The television 1 (or CPU or MPU) is required only to read out the program codes stored in a supplied recording medium and to carry out the program codes.

Examples of the recording medium for supplying the program codes to the television 1 encompass: tapes such as a magnetic tape and a cassette tape; disks such as magnetic disks (e.g., floppy (registered trademark) disk and hard disk); discs such as optical discs (e.g., CD-ROM, MO, MD, DVD, and CD-R); cards such as an IC card (e.g., memory card) and an optical card; and semiconductor memories (e.g., mask ROM, EPROM, EEPROM, and flash ROM).

Further, the television 1 may be configured to be connectable to a communication network, so that the television 1 may receive the program codes via a communication network from outside the television 1 and cause the CPU in the television 1 to execute the program codes. The communication network can be any network provided that the communication network can supply program codes to the television 1, and is not particularly limited to a particular kind or a particular shape. Examples of the communication network encompass the Internet, an intranet, an extranet, a LAN, an ISDN, a VAN, a CATV communication network, a mobile communication network, and a satellite communication network.

As a transmission medium constituting the communication network, any transmission medium can be used provided that the transmission medium can transmit the program codes, and is not limited to a particular configuration or a particular kind. Examples of the transmission medium encompass: wired transmission media such as IEEE1394, a USB (universal serial bus), a power-line carrier, a cable TV line, a telephone line, and an ADSL (asymmetric digital subscriber line); and wireless transmission media such as infrared rays (e.g., IrDA and a remote controller), Bluetooth (registered trademark), 802.11 wireless, an HDR, a cell-phone network, and a satellite line, and a digital terrestrial network. Note that the present invention may be also realized by a computer data signal which has the program codes specified with electronic transmission and is embedded in a carrier wave.

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

As described above, in a display control device of the present invention, it is desirable that the display controlling means display, on the display section, in different states, (i) a program cell group(s) which is(are) at least either of a program cell group in a second horizontal strip region or a program cell group in a second vertical strip region in an L-shaped region and (ii) a program cell group which is not located in the horizontal direction or the vertical direction of the program cell which has been selected in response to the instruction that the instruction reception section received, the L-shaped region being constituted by (i) the second horizontal strip region in contact with the first vertical strip region or any one of the pair of first vertical strip regions and (ii) the second vertical strip region in contact with the first horizontal strip region or any one of the pair of the first horizontal strip regions and being such a region that the program cell is located on a region of intersection of the second horizontal strip region with the second vertical strip region.

In view of the feature of the electronic program table, a time period in which a program of a selected program cell is broadcasted is displayed in one of a) a region in the first horizontal strip region, which region is near a boundary line between the first horizontal strip region and the second vertical strip region, and b) a region in the first vertical strip region, which region is near a boundary line between the first vertical strip region and the second horizontal strip region, meanwhile, a channel at which the program of the selected program cell is broadcasted (or a broadcasting station which broadcasts the program) is displayed in the other one of the region a) and the region b).

According to the above configuration, the display control device of the present invention noticeably displays at least either of (i) the second vertical strip region, which is located between the selected program cell and the region near the boundary line in the first horizontal strip region, or (ii) the second horizontal strip region, which is located between the selected program cell and the region near the boundary line in the first vertical strip region.

Accordingly, the user moves a direction of sight from the selected program cell along the strip region which is noticeably displayed. It is therefore possible for a user to easily grasp a broadcast time period of the selected program or a broadcasting station of the selected program, irrespective of a distance between the program cell and the region near the boundary line.

Therefore, the display control device of the present invention allows a user to more easily grasp a broadcast time period of the selected program or a broadcasting station of the selected program.

Note that, in the display control device of the present invention, for example, the display controlling means may display, on the display section, in different states, (i) a program cell group(s) which is(are) at least either of program cell group in a third horizontal strip region or a program cell group in a third vertical strip region in a cross-shaped region and (ii) a program cell group which is not located on the cross-shaped region, the cross-shaped region being constituted by the third horizontal strip region and the third vertical strip region, the third horizontal strip region being a region where the second horizontal strip region is extended toward the region serving as the intersection of the cross shape, the third vertical strip region being a region where the second vertical strip region is extended toward the region located serving as the intersection of the cross shape.

In the display control device of the present invention, it is desirable that the display controlling means display, on the display section, the program cell group located on the cross-shaped region and the program cell group which is not located on the cross-shaped region in different states.

According to the above configuration, the display control device of the present invention further allows a user to more easily grasp both a broadcast time period of the selected program and a broadcasting station of the selected program.

It is desirable that the display control device of the present invention the display controlling means displays a part of a program cell group located on any one of the second horizontal strip region and the second vertical strip region and a region in different states, which part of the program cell group is a part where (i) program cells in the program cell group and (ii) the any one of the second horizontal strip region and the second vertical strip region are overlapped with each other, which region is the program cells but other than the part.

According to the above configuration, in a case where the display control device of the present invention displays the second horizontal strip region in a different display state, the length of the second horizontal strip region is equal to that of the selected program cell. That is, in a case where the display control device of the present invention displays the first vertical strip region as a region for displaying time, the length of the second horizontal strip region indicates a rough broadcast time period of the program of the selected program cell.

Similarly, in a case where the display control device of the present invention displays the second vertical strip region in a different display state, the width of the second vertical strip region is equal to that of the selected program cell. That is, in a case where the display control device of the present invention displays the first horizontal strip region as a region for displaying time, the width of the second vertical strip region indicates a rough broadcast time period of the program of the selected program cell.

Therefore, the display control device of the present invention allows a user to easily grasp a rough broadcast time period of the program of the selected program cell.

In the display control device of the present invention, it is desirable that, in a case where a first program starts to be broadcasted or is being broadcasted at a broadcast start time at a first channel other than a second channel at which a second program of the program cell which has been selected in response to the instruction that the instruction reception section received starts to be broadcasted is to be broadcasted or is being broadcasted, the broadcast start time being a time at which the second program of the program cell starts to be broadcasted, the display controlling means display, in different states, (i) the program cell of the first program which starts to be broadcasted or is being broadcasted at the broadcast start time at the first channel and (ii) a program cell of a program which is not broadcasted at the broadcast start time.

According to the above configuration, in a case where a user causes the electronic program table to be displayed immediately after the program of the selected program cell starts to be broadcasted, the display control device of the present invention further allows a user to easily grasp contents of programs which are broadcasted at that time at other channels.

In the display control device of the present invention, it is desirable that: after a certain period time has passed after the instruction reception section received the instruction, the display controlling means enlarge a program cell which had been displayed until the certain time period has passed, and displays the program cell thus enlarged; and the display controlling means display, in the program cell thus enlarged after the certain time period has passed, program information more detail than program information which had been displayed until the certain time period has passed.

According to the above configuration, the display control device of the present invention further allows a user to grasp more detailed program information of the program of the program cell that the user selected.

In the display control device of the present invention, it is desirable that, until the certain time period has passed after the instruction reception section received the instruction, the display controlling means display a background color of the at least either of the program cell group in the second/third horizontal strip region or the program cell group in the second/third vertical strip region with a color relatively deeper than a color of the background color after the certain time period has passed.

According to the above configuration, in a case where a user continuously select program cells, the display control device of the present invention displays the at least either of the program cell group in the second/third horizontal strip region or the program cell group in the second/third vertical strip region with a color deeper than a color of the one of the program cell groups after the certain time period has passed after the user finished to select program cells.

Therefore, the display control device of the present invention further allows a user to easily grasp a program cell of which broadcasting station in which time zone is selected while the user continuously select program cells.

In the display control device of the present invention, it is desirable that: the display controlling means display, in the program cell which has been selected in response to the instruction that the instruction reception section received, an image and text information which are relevant to a/the second program of the program cell; and the display controlling means display the image as a background image of the text information.

In the display control device of the present invention, it is desirable that: the display controlling means display, in the program cell which has been selected in response to the instruction that the instruction reception section received, an image which is relevant to a/the second program of the program cell; and the display controlling means display the image such that, the larger a display size of the program cell is, the larger a display size of the image is. Alternatively, in the display control device of the present invention, it is desirable that: the display controlling means display, in the program cell which has been selected in response to the instruction that the instruction reception section received, an image which is relevant to the a/the second program of the program cell; and the display controlling means display the program cell so that at least one of a length and a width of the program cell corresponds with at least one of a length and a width of the image stored in a storage section.

According to each of the above configurations, the display control device of the present invention displays the image relevant to the program in a larger size as a display size of the program cell becomes large.

Therefore, the display control device of the present invention allows a user to easily understand the image relevant to the program of the program cell that the user selected.

In the display control device of the present invention, it is desirable that the display controlling means carry out at least one of two processes: (A) a display control process of displaying a region(s) and another region(s) in different states, the region(s) being located in the first vertical strip region(s) and being located in the horizontal direction of the program cell which has been selected in response to the instruction the instruction reception section received, the another region(s) being other than the region(s) in the first vertical strip region(s); and (B) a display control process of displaying a region(s) and another region(s) in different states, the region(s) being located in the first horizontal strip region(s) and being located in the vertical direction of the program cell which has been selected in response to the instruction the instruction reception section received, the another region(s) being other than the region(s) in the first horizontal strip region(s).

According to the above configuration, the display control device of the present invention further allows a user to more easily grasp at least one of a broadcast time period at which the program of the selected program cell is broadcasted and a broadcasting station which broadcasts the program.

In the display control device of the present invention, it is desirable that: the display controlling means display the pair of the first vertical strip regions, as the first-strip regions, in the peripheral portion; and the pair of the first vertical strip regions be regions for displaying the broadcast time zone.

Note that a television receiver which includes each means of the display control device and the display section is included in the scope of the present invention.

Further, a display control program for causing a computer to function as each means of a display control device, and a computer readable recording medium in which such a display control program is stored are also included in the scope of the present invention.

Industrial Applicability

A display control device of the present invention can be generally used in, for example, a personal computer including a display device such as a television receiver and a tuner.

REFERENCE SIGNS LIST 1 television
11a to 11c HDMI input terminal
11d HDMI switch
100 HDMI receiver
101a image input terminal
101b sound input terminal
102 BD drive
103 tuner
104 IP broadcasting tuner
105 satellite broadcasting tuner
106 OSD generation section
107 image selector
108 image processing circuit
109 LCD controller
110 LCD
111 sound selector
112 sound processing circuit
113 digital amplifier
114 speaker
115 Ethernet I/F
116 ROM (recording section)
117 RAM
118 CPU (display controlling means)
119 infrared radiation receiver (instruction reception section)
120 camera
121 human sensor
122 illuminance sensor
GI, GI1~GI3 genre icon
GB, GB1~GB3 genre display bar
CLf, CLh, CLn program cell

The invention claimed is:

1. A display control device, comprising:

display controlling means for generating a user interface screen of an electronic program table including one first horizontal strip region or a pair of first horizontal strip regions and one first vertical strip region or a pair of first vertical strip regions, and displaying the user interface screen on a display section, one of (i) the first horizontal strip region(s) and (ii) the first vertical strip region(s) being a region for displaying a broadcast time zone, the other one of (i) the first horizontal strip region(s) and (ii) the first vertical strip region(s) being a region for displaying at least one of a channel name and a broadcasting station name; and an instruction reception section which receives from a user an instruction to select a program cell from a plurality of program cells arranged like tiles in the electronic program table displayed on the display section, in a case where the user interface screen is displayed on the display section, the display controlling means providing, as first strip regions, the first horizontal strip region(s) and the first vertical strip region(s) in a peripheral portion of the electronic program table such that at least either of the pair of the first horizontal strip regions or the pair of the first vertical strip regions is provided for displaying the broadcast time zone or the at least one of the channel name and the broadcasting station name, the display controlling means displaying specific regions and other regions in different display states in a case where the instruction reception section receives the instruction, which specific regions are located in the pair of the first strip regions, respectively, located in the peripheral portion, and are located in a horizontal direction or a vertical direction of the program cell which has been selected in response to the instruction that the instruction reception section received, which other regions are regions located in the pair of the first strip regions but other than the specific regions, the specific regions and other regions displaying the broadcast time zone or the at least one of the channel name and the broadcasting station name, the display controlling means displaying, on the display section, in different states, (i) a program cell group(s) which is(are) at least either of a program cell group in a second horizontal strip region or a program cell group in a second vertical strip region in an L-shaped region and (ii) a program cell group which is not located in the horizontal direction or the vertical direction of the program cell which has been selected in response to the instruction that the instruction reception section received, which L-shaped region is constituted by (i) the program cell group in the second horizontal strip region in contact with the first vertical strip region or any one of the pair of first vertical strip regions and (ii) the program cell group in the second vertical strip region in contact with the first horizontal strip region or any one of the pair of the first horizontal strip regions and is such a region that the program cell is located on a region of intersection of the second horizontal strip region with the second vertical strip region, after the user stops sending the instruction and the display controlling means detects that the instruction reception section has stopped receiving the instruction, the display controlling means changes a background color of the at least either of the program cell group in the second horizontal strip region or the program cell group in the second vertical strip region;

wherein the display controlling means displays, on the display section, in different states, (i) a program cell group(s) which is(are) at least either of program cell group in a third horizontal strip region or a program cell group in a third vertical strip region in a cross-shaped region and (ii) a program cell group which is not located on the cross-shaped region, the cross-shaped region being constituted by the third horizontal strip region and the third vertical strip region, the third horizontal strip region being a region where the second horizontal strip region is extended toward the region serving as the intersection of the cross shape, the third vertical strip region being a region where the second vertical strip region is extended toward the region located serving as the intersection of the cross shape.

2. The display control device as set forth in claim 1, wherein the display controlling means displays, on the display section, the program cell group located on the cross-shaped region and the program cell group which is not located on the cross-shaped region in different states.

3. The display control device as set forth in claim 1, wherein the display controlling means displays a part of a program cell group located on any one of the second horizontal strip region and the second vertical strip region and a region in different states, said part of the program cell group is where (i) program cells in the program cell group and (ii) the any one of the second horizontal strip region and the second vertical strip region are overlapped with each other, said region is the program cells but other than the part.

4. The display control device as set forth in claim 1, wherein, in a case where a first program starts to be broadcasted or is being broadcasted at a broadcast start time at a first channel other than a second channel at which a second program of the program cell which has been selected in response to the instruction that the instruction reception section received starts to be broadcasted is to be broadcasted or is being broadcasted, the broadcast start time being a time at which the second program of the program cell starts to be broadcasted, the display controlling means displays, in different states, (i) the program cell of the first program which starts to be broadcasted or is being broadcasted at the broadcast start time at the first channel and (ii) a program cell of a program which is not broadcasted at the broadcast start time.

5. The display control device as set forth in claim 1, wherein:

after a certain period time has passed after the user stopped sending the instruction and the display controlling means detected that the instruction reception section stopped receiving the instruction, the display controlling means enlarges the program cell which has been selected in response to the instruction that the instruction reception section received, and displays the program cell thus enlarged; and the display controlling means displays, in the selected program cell thus enlarged, program information more detail than program information which had been displayed until the certain time period has passed.

6. The display control device as set forth in claim 1, wherein:

the display controlling means displays, in the program cell which has been selected in response to the instruction that the instruction reception section received, an image and text information which are relevant to a second program of the program cell; and the display controlling means displays the image as a background image of the text information.

7. The display control device as set forth in claim 1, wherein:
the display controlling means displays, in the program cell which has been selected in response to the instruction that the instruction reception section received, an image which is relevant to a second program of the program cell; and
the display controlling means displays the image such that, the larger a display size of the program cell is, the larger a display size of the image is.

8. The display control device as set forth in claim 1, wherein:
the display controlling means displays, in the program cell which has been selected in response to the instruction that the instruction reception section received, an image which is relevant to the a second program of the program cell; and
the display controlling means displays the program cell so that at least one of a length and a width of the program cell corresponds with at least one of a length and a width of the image stored in a storage section.

9. The display control device as set forth in claim 1, wherein the display controlling means carries out at least one of two processes: (A) a display control process of displaying a region(s) and another region(s) in different states, the region(s) being located in the first vertical strip region(s) and being located in the horizontal direction of the program cell which has been selected in response to the instruction the instruction reception section received, the another region(s) being other than the region(s) in the first vertical strip region(s); and (B) a display control process of displaying a region(s) and another region(s) in different states, the region(s) being located in the first horizontal strip region(s) and being located in the vertical direction of the program cell which has been selected in response to the instruction the instruction reception section received, the another region(s) being other than the region(s) in the first horizontal strip region(s).

10. The display control device as set forth in claim 1, wherein:
the display controlling means displays the pair of the first vertical strip regions, as the first-strip regions, in the peripheral portion; and
the pair of the first vertical strip regions are regions for displaying the broadcast time zone.

11. A television receiver, comprising:
each means of the display control device as set forth in claim 1; and
the display section.

12. A display control method, comprising:
a display control step of generating a user interface screen of an electronic program table including one first horizontal strip region or a pair of first horizontal strip regions and one first vertical strip region or a pair of first vertical strip regions, and displaying the user interface screen on a display section, one of (i) the first horizontal strip region(s) and (ii) the first vertical strip region(s) being a region for displaying a broadcast time zone, the other one of (i) the first horizontal strip region(s) and (ii) the first vertical strip region(s) being a region for displaying at least one of a channel name and a broadcasting station name; and
an instruction reception step of receiving from a user an instruction to select a program cell from a plurality of program cells arranged like tiles in the electronic program table displayed on the display section,
in a case where the user interface screen is displayed on the display section, the display controlling step including a step of providing, as first strip regions, the first horizontal strip region(s) and the first vertical strip region(s) in a peripheral portion of the electronic program table such that at least either of the pair of the first horizontal strip regions or the pair of the first vertical strip regions is provided for displaying the broadcast time zone or the at least one of the channel name and the broadcasting station name,
the display controlling step including a step of displaying specific regions and other regions in different states in a case where the instruction is received in the instruction reception step, which specific regions are located in the pair of the first strip regions, respectively, located in the peripheral portion, and are located in a horizontal direction or a vertical direction of the program cell which has been selected in response to the instruction that the instruction reception section received, which other regions are regions located in the pair of the first strip regions but other than the specific regions, the specific regions and other regions displaying the broadcast time zone or the at least one of the channel name and the broadcasting station name,
the display controlling step including a step of displaying, on the display section, in different states, (i) a program cell groups) which is(are) at least either of a program cell group in a second horizontal strip region or a program cell group in a second vertical strip region in an L-shaped region and (ii) a program cell group which is not located in the horizontal direction or the vertical direction of the program cell which has been selected in response to the instruction that the instruction reception section received, which L-shaped region is constituted by (i) the program cell group in the second horizontal strip region in contact with the first vertical strip region or any one of the pair of first vertical strip regions and (ii) the program cell group in the second vertical strip region in contact with the first horizontal strip region or any one of the pair of the first horizontal strip regions and is such a region that the program cell is located on a region of intersection of the second horizontal strip region with the second vertical strip region,
the display controlling step including a step of changing a background color of the at least either of the program cell group in the second horizontal strip region or the program cell group in the second vertical strip region after it is detected that the instruction is stopped;
wherein the display controlling means displays, on the display section, in different states, (i) a program cell group(s) which is(are) at least either of program cell group in a third horizontal strip region or a program cell group in a third vertical strip region in a cross-shaped region and (ii) a program cell group which is not located on the cross-shaped region, the cross-shaped region being constituted by the third horizontal strip region and the third vertical strip region, the third horizontal strip region being a region where the second horizontal strip region is extended toward the region serving as the intersection of the cross shape, the third vertical strip region being a region where the second vertical strip region is extended toward the region located serving as the intersection of the cross shape.

13. A non-transitory computer readable recording medium in which the display control program is stored, the display control program causing a computer to function as each means of a display control device recited in claim 1.

* * * * *